United States Patent [19]

Sakata et al.

[11] Patent Number: 5,231,507
[45] Date of Patent: Jul. 27, 1993

[54] INFORMATION SIGNAL RECORDING/REPRODUCING APPARATUS WITH TIME BASE CORRECTION FACILITY

[75] Inventors: Tsuguhide Sakata; Tetsuro Inoue; Saburou Nakazato, all of Tokyo; Kazuhito Ohashi, Kanagawa; Toshihiko Mimura, Kanagawa; Tokihiko Ogura, Kanagawa; Yasutomo Suzuki, Kanagawa; Tomohiko Sasatani, Kanagawa; Somei Kawasaki, Tokyo, all of Japan

[73] Assignee: Canon Kabushiki Kaisha, Tokyo, Japan

[21] Appl. No.: 831,084

[22] Filed: Feb. 5, 1992

Related U.S. Application Data

[63] Continuation of Ser. No. 185,520, Apr. 25, 1988, abandoned.

[30] Foreign Application Priority Data

| Apr. 28, 1987 | [JP] | Japan | 62-107014 |
| Jul. 31, 1987 | [JP] | Japan | 62-191861 |
| Jul. 31, 1987 | [JP] | Japan | 62-192462 |
| Jul. 31, 1987 | [JP] | Japan | 62-192465 |
| Jul. 31, 1987 | [JP] | Japan | 62-192466 |

[51] Int. Cl.$^5$ .............................................. H04N 9/80
[52] U.S. Cl. .................................. 358/320; 358/326; 358/330; 360/36.1
[58] Field of Search ............... 358/310, 315, 319, 320, 358/322, 324–326, 330, 337, 339, 342, 23, 25, 35; 360/30, 33.1, 36.1, 37.1, 70, 75

[56] References Cited

U.S. PATENT DOCUMENTS

| 3,350,504 | 10/1967 | Takayanagi | 360/30 |
| 3,830,968 | 8/1974 | Redlich et al. | 360/30 X |
| 3,992,719 | 11/1976 | Machida | 358/319 |
| 4,163,263 | 7/1979 | Rotter | 360/36.1 X |
| 4,306,254 | 12/1981 | Koda et al. | 360/75 X |
| 4,481,546 | 11/1984 | Ito et al. | 360/30 |
| 4,591,930 | 5/1986 | Baumeister | 360/30 X |
| 4,746,992 | 5/1988 | Hashimoto et al. | 358/330 X |
| 4,839,615 | 6/1989 | Sato | 358/330 X |

Primary Examiner—Wayne R. Young
Attorney, Agent, or Firm—Robin, Blecker, Daley & Driscoll

[57] ABSTRACT

An information signal recording/reproducing apparatus includes a recording apparatus and a reproducing apparatus. The recording apparatus is arranged to record on a recording medium an information signal after angle-modulating the signal in such a way as to cause a signal corresponding to a timewise portion of the angle-modulated information signal to be in a given relation to a reference signal. The reproducing apparatus is arranged to angle-demodulate the angle-modulated information signal when it is reproduced from the recording medium, and to perform time base correction on the basis of the signal part of the angle-modulated information signal. Time base variations occurring during the reproduction can be accurately carried out by the arrangement without having any special signal added to the information signal during recording.

7 Claims, 28 Drawing Sheets

INFORMATION SIGNAL RECORDING/REPRODUCING APPARATUS WITH TIME BASE CORRECTION FACILITY

This is a continuation application under 37 CFR 1.62 of prior application Ser. No. 185,520, filed Apr. 25, 1988 now abandoned.

BACKGROUND OF THE INVENTION

1. Field of the Invention

This invention relates to an apparatus for recording and/or reproducing an information signal on or from a recording medium.

2. Description of the Related Art

The known recording/reproducing apparatuses of the kind having a recording part for recording a color video signal, for example, on a magnetic disc-shaped recording medium and a reproducing part for reproducing the recorded color video signal from the recording medium, include a still video system.

The still video system has adopted, for example, a method in which a color video signal is recorded by dividing the color video signal into a luminance signal component and a chrominance signal component and then by modulating them into different frequency bands from each other; and the recorded signal is reproduced by reproducing these modulated components. In another known method, a color video signal is arranged to be recorded and/or reproduced in a state of a composite color video signal having a luminance signal component and a chrominance signal component frequency-multiplexed in an interleaved form. Systems adopting that method for recording and reproduction include, for example, a system called an optical disc system. The optical disc system is arranged to record the color video signal on an optical disc together with a color burst signal which is included in the color video signal; to reproduce the recorded color video signal by using the color burst signal for correcting time base variations which take place in the color video signal due to jitters caused by a disc rotating motor, etc.

The still video signal recording and/or reproducing system mentioned in the foregoing has been incapable of adequately preventing the adverse effect of the jitters as it has no reference signal recorded on the recording medium for the time base correction. The optical disc recording and/or reproducing system is capable of correcting the time base of the color video signal by virtue of the use of the recorded burst signal. However, for a signal having no color burst signal like in the case of a black-and-white video signal, it has been incapable of adequately carrying out the time base correction.

Further, the conventional color video signal recording and/or reproducing apparatus has necessitated use of two monostable multivibrators as a circuit for extracting the part of a reproduced color video signal in which the color burst signal is inserted. This has resulted in the complex arrangement of the apparatus.

SUMMARY OF THE INVENTION

This invention aims to solve the above stated problems of the prior art.

It is an object of the invention to provide an information signal recording apparatus which is capable of recording an information signal on a recording medium in such a way as to facilitate the correction of the time base variations which take place in the information signal during the reproduction thereof without having any special signal added to the information signal during recording.

Under this object, an information signal recording apparatus which is arranged according to the invention to record an information signal on a recording medium comprises: modulation means, arranged to receive an input information signal, for angle-modulating the input information signal and to produce an angle-modulated information signal; correction means arranged to compare, with a reference signal, a signal corresponding to a timewise portion of the angle-modulated information signal and to correct the angle-modulated information signal produced from the angle modulation means according to the result of comparison; and recording means for recording on the recording medium the angle-modulated information signal corrected by the correction means.

It is another object of the invention to provide an information signal reproducing apparatus which is capable of accurately removing the time base variations occurring in an information signal during the process of reproduction without necessitating any special signal to be additionally recorded on a recording medium along with the information signal in recording the signal.

Under that object, an apparatus arranged according to the invention to reproduce an information signal from a recording medium comprises: reproducing means for reproducing, from the recording medium, a modulated information signal which has been modulated to have a timewise portion thereof at a given frequency; demodulation means for demodulating the modulated information signal reproduced by the reproducing means to produce a demodulated information signal; and time base correction means for correcting the time base of the demodulated information signal produced from the demodulation means on the basis of the timewise portion of the signal.

It is a further object of the invention to provide a video signal recording apparatus arranged to record a video signal in such a manner that time base variations which take place in the video signal during recording or reproduction thereof on or from a recording medium can be promptly removed.

Under this object, an apparatus arranged according to the invention to record a video signal on a recording medium comprises: reference signal generating means for generating a reference signal; angle modulation means arranged to receive the video signal, to angle modulate the received video signal to be in phase-synchronism with the reference signal generated by the reference signal generating means and to produce the video signal as an angle modulated video signal; replacing means for replacing a portion of the angle modulated video signal corresponding to the synchronizing signal portion thereof with the reference signal generated by the reference signal generating means; and recording means for recording on the recording medium the angle modulated video signal which has the synchronizing signal portion thereof replaced with the reference signal generated by the reference signal generating means.

These and other objects and features of the invention will become apparent from the following detailed description of embodiments thereof taken in connection with the accompanying drawings.

DETAILED DESCRIPTION OF THE PREFERRED EMBODIMENTS

The following description of embodiments of the invention will show the details thereof: While the invention is applied to apparatuses of the kind arranged to record or reproduce a video signal on or from a disc-shaped recording medium in these embodiments, the invention is of course not limited to the apparatuses of that kind. This invention is applicable also to apparatuses of different kinds using, for example, a tape-shaped recording medium. Further, the recording media usable according to the invention include such media that are arranged to use light or magnetism. The apparatuses to which the invention is applicable include not only the apparatuses handling composite video signals but also apparatus handling component video signals and any signals so long as they have synchronizing (hereinafter abbreviated to sync) signals.

Figure 1:
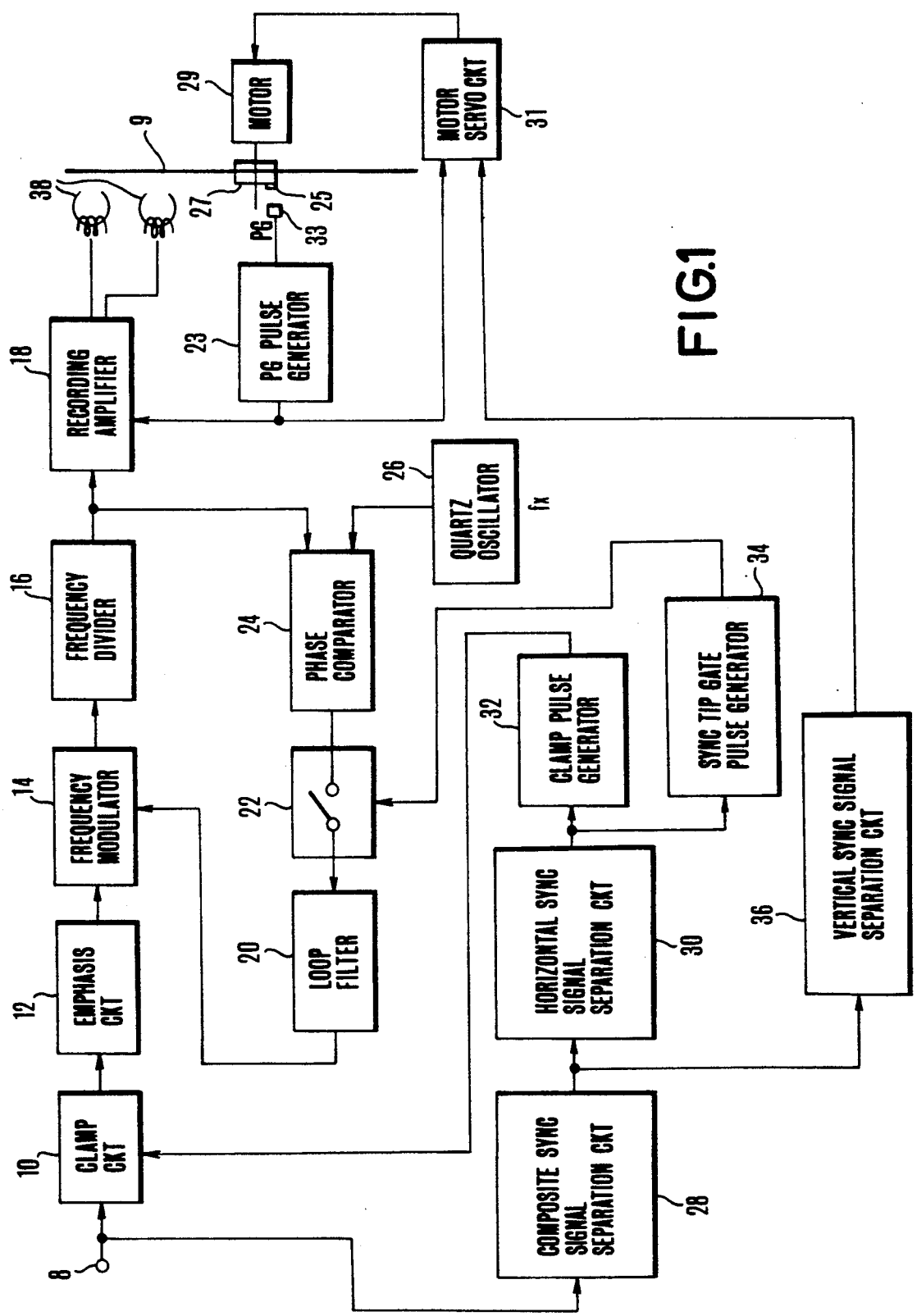
FIG. 1 is a block diagram showing the recording part of a recording/reproducing apparatus arranged according to this invention as a first embodiment thereof.
Figure 6:
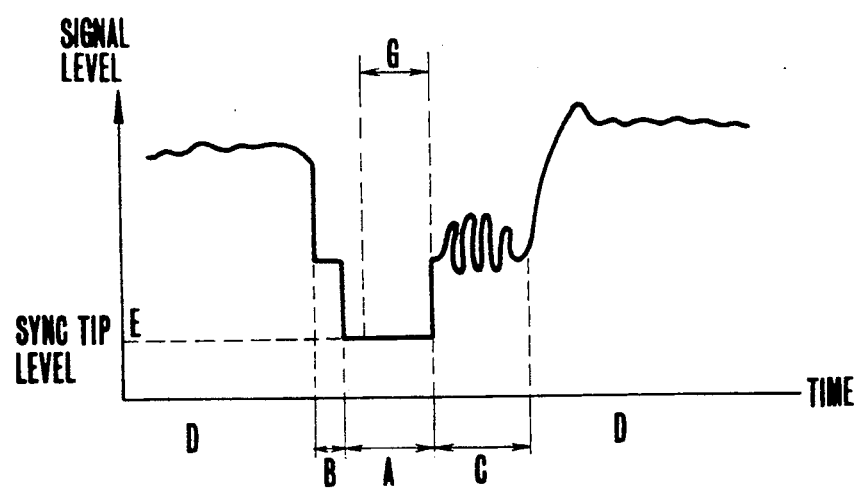
FIG. 6 is a wave form chart showing the synchronizing signal part of a video signal to illustrate of the operation of the first embodiment shown in FIG. 1.

FIG. 1 is a block diagram showing the recording part of a recording and/or reproducing apparatus which is arranged according to this invention as a first embodiment thereof. Referring to FIG. 1, an input terminal 8 is arranged to receive a composite color video signal which is, for example, a TV signal of the NTSC system. A clamp circuit 10 is arranged to clamp the sync tip part of the video signal to a given level. A voltage-to-frequency converter or frequency modulator 14 is arranged to have two control inputs. A frequency divider 16 is arranged to divide the frequency of the input signal into ½ thereof. The illustration includes a recording amplifier 18; a loop filter 20 for a phase locked loop (hereinafter abbreviated to PLL) circuit; an analog switch 22 which is arranged to pass a control signal just for a given period of time; a set-reset type phase comparator 24 which is, for example, an IC called MC4044 made by Motorola, Inc.; a quartz oscillator 26 which is arranged to generate a frequency to be used as a reference signal; a composite sync signal separation circuit 28 which is arranged to separate a composite sync signal from the video signal received by the input terminal 8; a horizontal sync signal separation circuit 30; a clamp pulse generator 32; a sync tip gate pulse generator 34 which is provided for use of a phase comparison signal for a given period of time; and a vertical sync signal separation circuit 36. A magnetic head 38 is arranged to record a video signal. A motor 29 is arranged to rotate a magnetic disc 9. A PG pin 25 is arranged at a part of the center core 27 of the magnetic disc 9 to show the rotation phase of the magnetic disc 9. A PG pulse generator 23 is arranged to shape the wave form of a PG pulse signal produced from a PG coil 33 every time the PG pin 25 is detected. A motor servo circuit 31 is arranged to control the rotation of the disc rotating motor 29 in such a way as to bring to a given value a phase difference between the wave form shaped PG pulse signal coming from the PG pulse generator 23 and a vertical sync signal separated from a vertical sync signal separation circuit 36. The PG pulse signal produced from the PG pulse generator 23 is also supplied to the recording amplifier 18 for channel change-over control over the magnetic head 38. The recording part operates as follows:

Referring to FIG. 6, the axis of abscissa shows a time base of the video signal and the axis of ordinate shows the level of the signal. A part A indicates the sync tip part of the composite video signal. A part B indicates a part where the fall of the sync tip part A of the composite video signal is to be detected as the fall of a horizontal sync signal. A part C indicates a part where the rise of the sync tip part A of the composite video signal is to be detected as the rise of the horizontal sync signal. In the case of a color video signal, the color burst of the signal is inserted in the part C.

The signal which is received at the input terminal 8 and is, for example, a composite color video signal, has the horizontal sync signal portion A (FIG. 6) thereof clamped at a given DC potential by the clamp circuit 10. With the composite sync signal separated by the composite sync signal separation circuit 28 from the input composite color video signal, the clamp pulse generator 32 generates the above stated clamp pulse according to the timing defined by the horizontal sync signal separated from the composite sync signal by the horizontal sync signal separation circuit 30.

The input signal which is thus clamped to the given DC potential by the clamp circuit 10 is supplied to the emphasis circuit 12. The circuit 12 imparts a given frequency characteristic to the clamped input signal (for example, by raising the level of the high frequency band component thereof). After completion of the emphasizing process, the input signal is supplied to one of the input terminals of the frequency modulator 14. The frequency modulator 14 is arranged, like the IC of Texas Instrument, Inc. called 74LS628, to be provided with a frequency control input terminal and a conversion range control input terminal. The output signal of the emphasis circuit 12 is applied to the frequency control input terminal of the frequency modulator 14. In the case of this embodiment, the frequency modulator 14 performs a modulating action by making frequency allocation two times as much as a given frequency allocation. After modulation, the frequency-modulated video signal is supplied to the frequency divider 16 to have its frequency divided into ½ thereof. This process gives a frequency-modulated video signal of a desired frequency allocation. In the case of the first embodiment, as described above, the input video signal is frequency-modulated into a double frequency by the frequency modulator 14 and is then frequency divided into ½ frequency by means of the frequency divider 16, for the purpose of preventing a beat resulting from some interference between the secondary distortion component of the color subcarrier signal of the frequency-modulated video signal (7.16 MHz in case that the video signal is the TV signal of the NTSC system, or 8.86 MHz in the event of the TV signal of the PAL or SECAM system) and the frequency-modulated carrier of the video signal. The video signal is thus first modulated to a high frequency band and is then frequency-divided into a low frequency band.

The output of the frequency divider 16 is supplied to the phase comparator 24. The phase comparator 24 compares the phase of the output of the divider 16 with that of a reference sync tip frequency signal obtained from the quartz oscillator 26. The error signal output of the phase comparator 24 is supplied to the switch 22. The switch 22 becomes conductive only for a period of time corresponding to the sync tip part of the video signal according to a pulse signal which is produced from the sync tip gate pulse generator 34 and is arranged to be at a high level only for the period of time G as shown in FIG. 6. The output signal of the phase comparator 24 is then supplied to the loop filter 20 which is provided for a PLL. The conductive period of time of the switch 22 is defined by the sync tip gate pulse generator 34 in such a way as to avoid a wave form portion that is distorted by the emphasizing process of the emphasis circuit 12. The error signal output of the phase comparator 24 which comes via the switch 22 is integrated by the loop filter 20 to receive predetermined phase compensation. The phase-compensated error signal is then supplied to the converting range control input terminal (frequency-controllable in the same manner as the frequency control input terminal) of the frequency modulator 14. A PLL circuit is thus formed by a loop of the frequency modulator 14—the frequency divider 16—the phase comparator 24—the switch 22—the loop filter 20—and the frequency modulator 14. The video signal which is thus frequency modulated by the frequency modulator 14 through this PLL circuit keeps the sync tip part frequency at a value coinciding with the preset frequency of the reference oscillator by virtue of the PLL circuit. The frequency modulated video signal is then supplied to the recording amplifier 18.

The output of the recording amplifier 18 is supplied to the magnetic head 38 to be recorded on the magnetic disc 9. The recording timing control over the head 38 is omitted from the description given herein.

It goes without saying that, in recording, the magnetic disc 9 is rotated in synchronism with the vertical sync signal which is separated from the input composite video signal by the vertical sync signal separation circuit 36.

Figure 2:
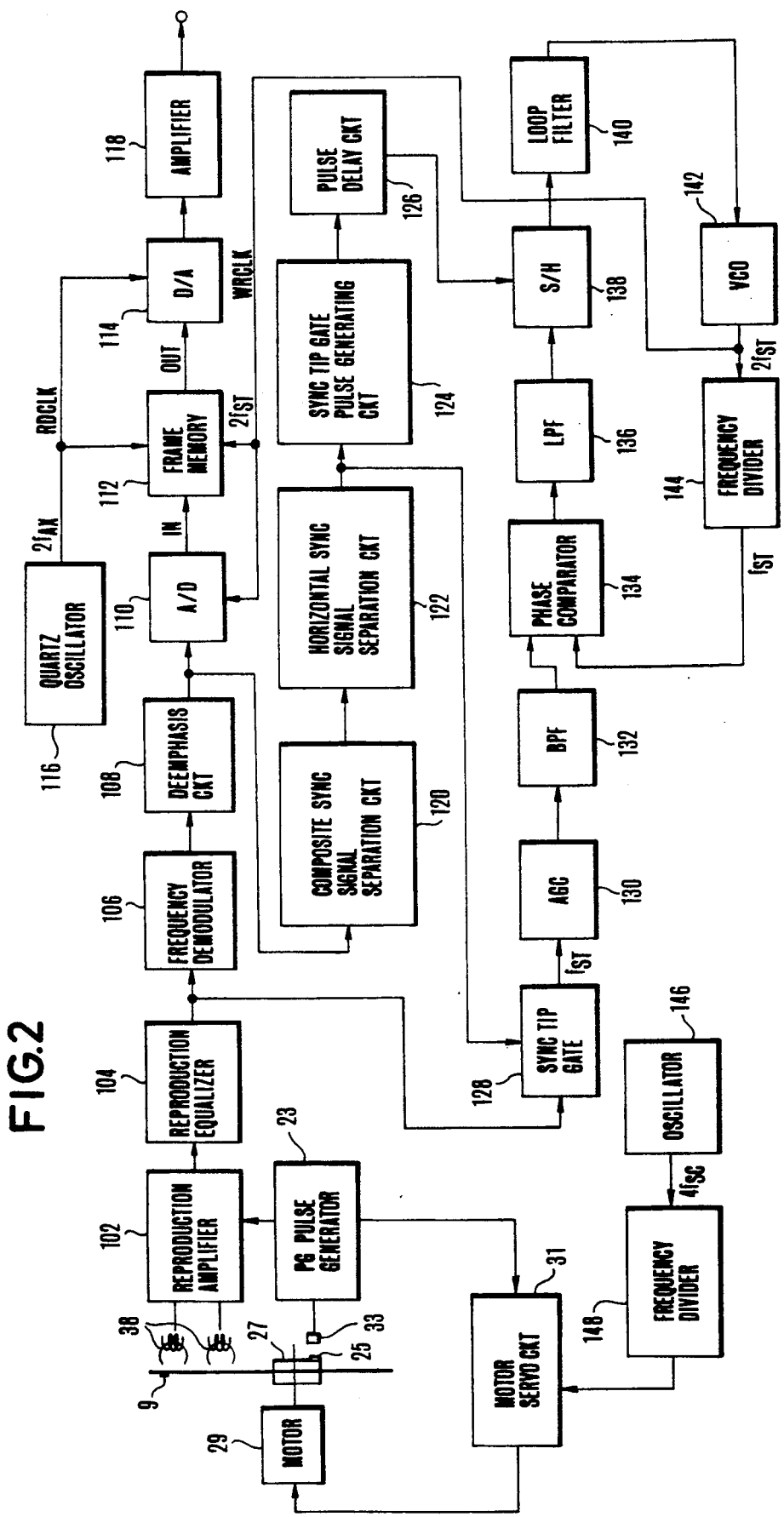
FIG. 2 is a block diagram showing the reproducing part of the recording/reproducing apparatus arranged as the first embodiment of the invention.

FIG. 2 shows in a block diagram the reproducing part of the recording/reproducing apparatus which is arranged as the first embodiment of this invention. In FIG. 2, the parts which are in common with the arrangement shown in FIG. 1 are indicated by the same reference numerals and are omitted from description. The illustration includes a reproduction amplifier 102; a reproduction equalizer 104; a frequency demodulator 106; a deemphasis circuit 108; an analog-to-digital (A/D) converter 110; a frame memory 112 which is arranged to permit reading and writing in synchronism with a writing clock signal WRCLK and a reading clock signal RDCLK; a digital-to-analog (D/A) converter 114; a quartz oscillator 116 which is arranged to generate a reference signal for reading a signal from the frame memory 112; an amplifier 118 which is arranged to amplify the output of the D/A converter 114; a composite sync signal separation circuit 120; a horizontal sync signal separation circuit 122; a sync tip gate pulse generating circuit 124; a pulse delay circuit 126 which has a given length of delay time; a sync tip gate 128 which is arranged to extract a sync tip part from the output of the reproduction equalizer 104; an AGC (automatic gain control) circuit 130; a band pass filter (BPF) 132 which is arranged to have the frequency of the sync tip part (fST) set at the center of its passing band; a phase comparator 134 which includes a double balanced type modulator; a low pass filter (LPF) 136 which is arranged to take out only an error signal produced from the above stated phase comparator 134; a sample-and-hold (S/H) circuit 138 which is arranged to sample and hold the output of the LPF 136 at a given timing; a loop filter 140 for a PLL; a voltage controlled oscillator (VCO) 142; a frequency divider 144 which is arranged to divide the frequency of the input signal into ½ thereof; an oscillator 146 which is arranged to generate a reference signal (4 fsc) for driving the magnetic disc 9 to rotate during reproduction; and a frequency divider 148 arranged to form from its oscillation output a reference signal which is to be used for driving the magnetic disc 9 to rotate and has the same frequency as that of the vertical sync signal.

The reproducing part of the first embodiment shown in FIG. 2 operates as follows: The motor driving reference signal which is obtained from the signal of frequency 4 fsc produced from the oscillator 146 by frequency-dividing it through the frequency divider 148 is supplied to the motor servo circuit 31. The motor servo circuit 31 compares the phase of the reference signal with that of the PG pulse signal obtained from the PG pulse generator 23 and drives the motor 29 to rotate in such a way as to have the two signals phase-locked at a given phase difference. With the magnetic disc 9 thus controlled at a predetermined rotating cycle, a magnetic head shifting mechanism which is not shown shifts the magnetic head 38 to a desired position on the surface of the disc 9. Then, a frequency-modulated (FM) video signal is reproduced and produced from the head 38. The reproduced FM video signal is very weak and is, therefore, amplified by the reproduction amplifier 102. The amplified reproduced FM video signal is supplied to the reproduction equalizer 104 to have its amplitude and phase corrected in a predetermined manner. The corrected video signal is supplied to the frequency demodulator 106 to be demodulated there. The demodulated reproduced video signal is supplied to the deemphasis circuit 108 to be deemphasized by the circuit 108 which is of a characteristic opposite to that of the emphasizing process performed during the recording operation. The video signal is thus brought back to the original frequency characteristic thereof by the deemphasis circuit 108. The deemphasized video signal is converted into a digital signal by the A/D converter 110. The digital video signal is written into the frame memory 112. In this instance, the writing clock signal WRCLK is formed in synchronism with the frequency of the sync tip part of the reproduced FM (frequency modulated) video signal as will be further described later on.

In a case where one frame portion of the video signal is recorded during the recording operation, for example, writing into the frame memory 112 is controlled in such a manner that only one frame portion of the reproduced video signal is allowed to be written into the memory. After writing, the signal thus stored is read out from the memory 112 under the control of the reading clock signal RDCLK which is obtained from the quartz oscillator 116 and is supplied to the D/A converter 114. The D/A converter 114 converts the digital signal read out from the memory 112 into an analog signal in accordance with the reading clock signal RDCLK. The analog signal thus obtained is supplied to the amplifier 118. If the above stated writing clock signal WRCLK is precisely in synchronism with the frequency of the sync tip part of the reproduced FM video signal, any time base error of the reproduced video signal is corrected during the process of writing into the frame memory 112. Then, with the signal read out by using a predetermined clock signal, time base correction (TBC) is eventually accomplished and any jitters that result from uneven rotation of the magnetic disc 9 can be removed from the reproduced video signal.

The writing clock signal WRCLK which is in synchronism with the frequency of the sync tip part of the reproduced FM video signal is obtained in the following manner: A part corresponding to the sync tip part of the reproduced FM video signal produced from the reproduction equalizer 104 is extracted from the signal by the sync tip gate 128. The extracting timing of the sync tip gate 128 is as follows: A composite sync signal is first separated from the frequency deemphasized reproduced video signal by the composite sync signal separation circuit 120. Then, a horizontal sync signal is separated by the horizontal sync signal separation circuit 122. The separated horizontal sync signal is supplied to the sync tip gate pulse generator 124, which then generates sync tip gate pulses.

After the sync tip part is alone extracted from the reproduced FM video signal by the sync tip gate 128, extracted part is supplied to the AGC (automatic gain control) circuit 130 to be processed there to have a limited amplitude. The output of the AGC circuit 130 is supplied to the BPF 132 to have unnecessary noises removed. After the BPF 132, sync tip part of the reproduced FM video signal is supplied as a reference input to the phase comparator 134 which is of the double balanced modulator type (i.e. a multiplying type).

The phase comparator 134 phase-compares the above stated reference signal with a comparison signal fed back through the PLL circuit which will be described later. As a result of the phase comparison, the comparator 134 produces an error signal. Since the comparator 134 is of the multiplying type, the error signal includes some unnecessary high band component. This high band component is removed by the LPF 136. The output of the LPF 136 is supplied to the S/H circuit 138. The circuit 138 samples and holds a part of the output of the LPF 136 corresponding to a predetermined sync tip part. The sample-and-hold timing of the S/H circuit 138 is controlled by the pulse signal produced from the sync tip gate pulse generating circuit 124. However, the timing is adjusted by the pulse delay circuit 126 in such a way as to make up for a delay caused by the LPF 136 and to have the optimum part of the error signal sampled and held by the S/H circuit 138.

The error signal which is thus sampled and held is phase-corrected by the loop filter 140 of the PLL circuit and is then supplied to the voltage controlled oscillator (VCO) 142. The oscillation frequency of the VCO 142 is set at a value which is an n times as high as the frequency fST of the sync tip part. In other words, the oscillation frequency is n fST. In the case of this embodiment, the following description will be given on the assumption of n=2. The oscillation frequency of the VCO 142 is variable by the error signal from the loop filter 140 with the value 2 fST remaining at the center of the variable values. The output of the VCO 142 is supplied to the frequency divider 144. The divider 144 divides the frequency of the input signal into ½ thereof and thus produces a variable signal having the frequency value fST at the center thereof. The PLL circuit is formed by a loop consisting of the phase comparator 134—the LPF 136—the S/H circuit 138—the loop filter 134—the VCO 142—the frequency divider 144—and the phase comparator 134. The PLL circuit which is formed in this manner causes the oscillation frequency of the VCO 142 to become exactly twice as high as its original value. The oscillation output of the VCO 142 which is thus obtained is supplied to the A/D converter 110 and to the frame memory 112 and is used as the writing clock signal WRCLK. This arrangement precludes the above stated jitter component from the frame memory 112 so that a digital, reproduced video signal which is obtained under TBC can be stored at the frame memory 112.

The digital reproduced video signal stored at the frame memory 112 is read out with the oscillation signal of the quartz oscillator 116 which has the oscillation frequency of 2 fST used as the reading clock signal RDCLK. The signal read out is supplied to the amplifier 118 via the D/A converter 114.

The reproducing part of the first embodiment which is arranged as described above is capable of attaining the advantageous effect of TBC under the object of the invention.

In accordance with the method of the first embodiment, the frequency of the sync tip part of the frequency modulated video signal is compared with the reference frequency in recording and is recorded after it has been processed to have a given frequency. In reproducing the recorded signal, the TBC is applied to the signal by using the frame memory 112 with reference to the reproduced frequency of the sync tip part. Compared with the conventional method of applying the TBC by using a color burst signal, the embodiment is advantageous because it is capable of applying TBC also to a signal having no color burst signal like in the case of a black-and-white video signal. Further, the use of the sync tip part which is included in the video signal obviates the necessity of having any other signal added to the video signal for TBC. For extracting the sync tip part, the embodiment uses the horizontal sync signal separation circuit which is generally used for processing a video signal. Therefore, the above stated advantageous effect is attainable without requiring much addition to the circuit arrangement.

In the embodiment described, if the frequency of the sync tip part of the video signal after frequency modulation is arranged to be higher than the frequency of the color subcarrier signal, the accuracy of the embodiment can be further enhanced to exceed that of the conventional TBC using the color burst signal.

Figure 3:
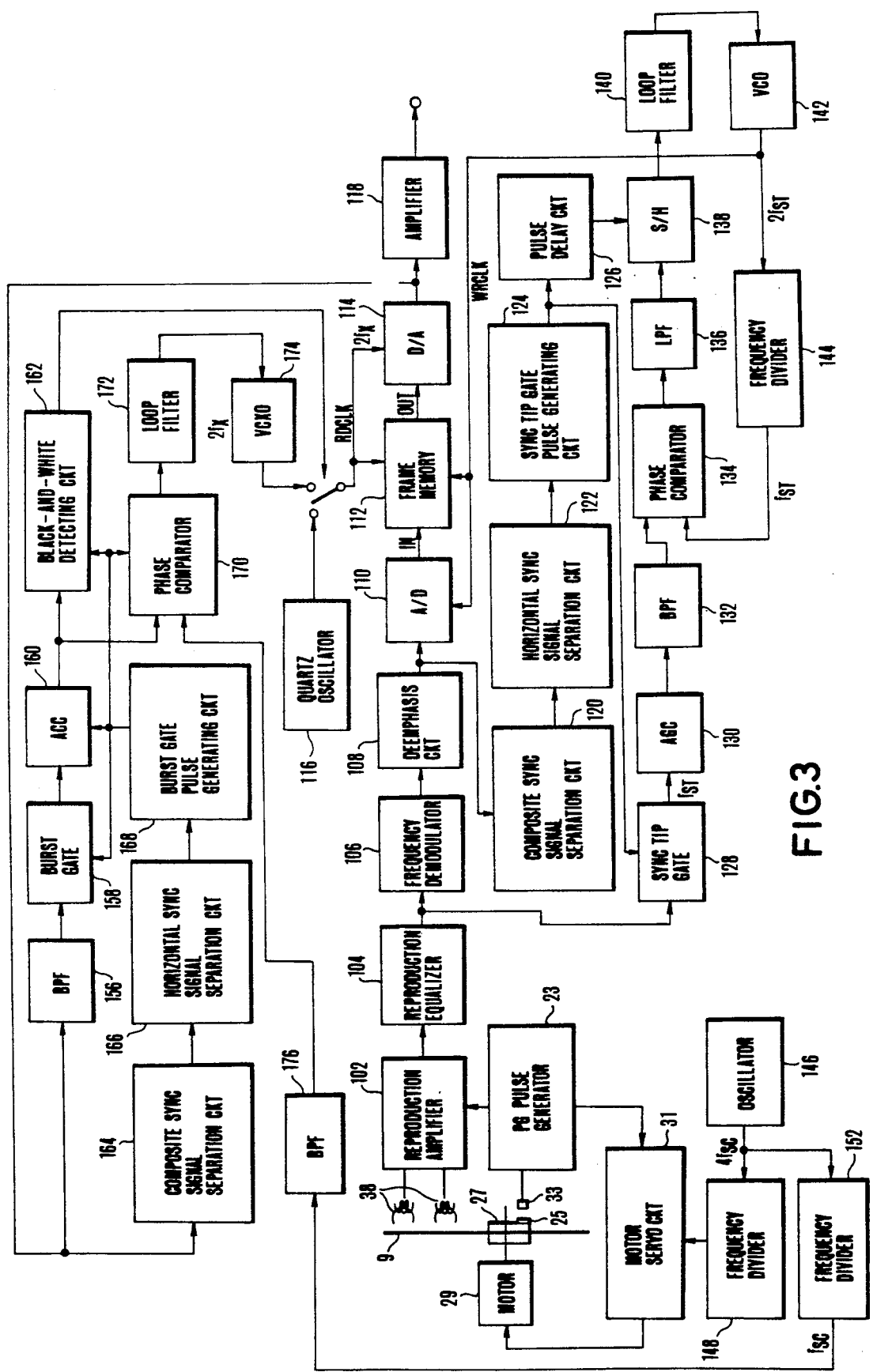
FIGS. 3, 4 and 7 are block diagrams showing examples of modification of the embodiment shown in FIG. 2.

FIG. 3 shows a modification of the first embodiment shown in FIG. 2. In FIG. 3, the same parts as those of the first embodiment are indicated with the same reference numerals and the details of them are omitted from the following description, which covers only the difference of the modification from the first embodiment.

In the arrangement of FIG. 3, the portion of it up to a point at which the reproduced video signal is written into the frame memory 112 is identical with the arrangement shown in FIG. 2. While the signal is read out by using the reading clock signal of a fixed frequency in the case of the arrangement shown in FIG. 2, that arrangement is changed to carry out TBC even for the process of reading, so that the quality of the reproduced video signal can be further enhanced.

The TBC is carried out in the following manner in reading out the signal from frame memory 112: Referring to FIG. 3, a BPF (band-pass filter) 156 is arranged to allow to pass only the chrominance signal band of the composite color video signal. A burst gate 158 is provided for taking out only the color burst part included in the chrominance signal of the video signal. An automatic color control (ACC) circuit 160 is arranged to make the color burst part have a given fixed amplitude. A black-and-white detecting circuit 162 is arranged to determine that the input signal is a black-and-white video signal when the level of the color burst part is lower than a given level. FIG. 3 further includes a multiplying type phase comparator 170; a loop filter 172 of a PLL circuit; a voltage controlled oscillator (hereinafter referred to as VCXO) 174 which uses a quartz oscillator; a composite sync signal separation circuit 164; a horizontal sync signal separation circuit 166; and a burst gate pulse generating circuit 168. Further, another oscillator 146 is arranged to generate a reference signal for driving the motor 29 to rotate and to oscillate at a frequency of 4 fsc. A frequency divider 152 is arranged to divide the frequency of the input signal into ¼ of the frequency and is provided for the purpose of obtaining a clock signal of a frequency fsc from the above stated signal of 4 fsc frequency. A frequency divider 148 is arranged, like in the case of FIG. 2, to generate a vertical sync signal which will be used as a basis for control over the rotation of the magnetic disc 9. A BPF 176 is arranged to allow the frequency fsc to pass and is provided for the purpose of shaping the clock signal of frequency fsc produced from the frequency divider 152 into a sinusoidal wave form.

The signal produced from the D/A converter 114 is supplied to the BPF 156. The BPF 156 separates a chrominance signal. The separated chrominance signal is supplied to the burst gate 158 to have its color burst part alone extracted and supplied to the ACC circuit 160. A burst gate pulse signal is formed by a burst gate pulse generator 168 on the basis of the horizontal sync signal obtained by separating a composite sync signal at the composite sync signal separation circuit 164 from the output of the D/A converter 114 and by separating the horizontal sync signal at the horizontal sync signal separation circuit 166 from the composite sync signal. The ACC circuit 160 performs amplitude control in accordance with the input timing of the burst gate pulse signal in such a way as to have the level of the color burst part at a given amplitude. The gain control range of the ACC circuit 160 is relatively narrow. Therefore, in the event of signal having no color burst part, the ACC circuit 160 does not produce any signal of a level detectable by the black-and-white detecting circuit 162 which will be described later on. The color burst part signal which is thus controlled to have the given amplitude is supplied to the phase comparator 170 to be phase-compared with the reference signal of fixed frequency fsc which is supplied to the phase comparator 170 via the BPF 176. As a result of comparison, the phase comparator 170 produces an error signal representing an error or a difference from the reference signal fsc. An unnecessary high frequency band component included in this error signal is removed by the loop filter 172.

In this instance, unlike in the case of writing, the PLL circuit performs no sample-and-hold action by using any S/H circuit, because: The use of a quartz oscillator for the VCXO 174 ensures a high degree of stability, which obviates the necessity of holding the control signal. However, the sample-and-hold action of course may be performed.

The output of the loop filter 172 is supplied to the VCXO 174. The phase of the reading clock signal is controlled by this. The loop arrangement of the PLL circuit for the reading clock signal is in the sequence of: The phase comparator 170—the loop filter 172—the VCXO 174—the frame memory 112—the D/A converter 114—the BPF 156—the burst gate 158—and the ACC circuit 160—the phase comparator 170. The reading clock signal (the output of the VCXO 174) is thus controlled in such a way as to have the signal of the color burst part of the output signal of the D/A converter 114 to accurately coincide with the reference signal fsc which is the output of the frequency divider 152.

Further, in the event of a black-and-white video signal having no color burst part, the black-and-white detecting circuit 162 detects it. In that case, the use of the reading clock signal is switched over to the output of the quartz oscillator 116 which has a fixed oscillation frequency. This switch-over action prevents jitters from being caused by the frequency fluctuations of the oscillation output of the VCXO 174 resulting from any erroneous action of the PLL circuit due to the absence of the color burst part in the video signal.

Figure 4:
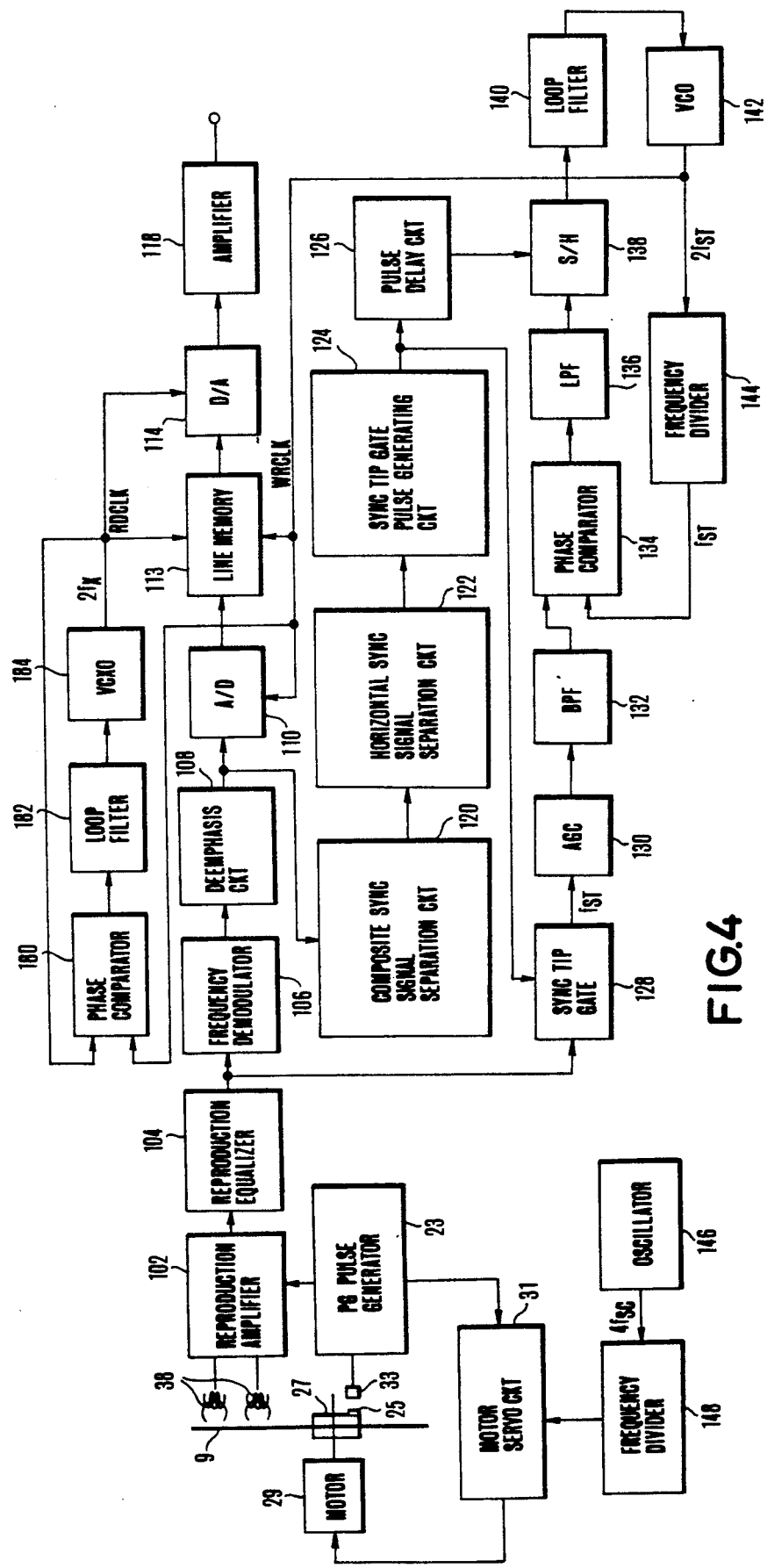

FIG. 4 shows another example of modification of the arrangement shown in FIG. 2. In FIG. 4, the same parts as those of FIGS. 2 and 3 are indicated with the same reference numbers and the details of them are omitted from description. A line memory 113 is arranged to have a writing clock input and a reading clock input separately from each other. The writing addresses and the reading addresses are offset to a given extent relative to each other to prevent writing and reading from overlapping each other. The offsetting extent is predetermined according to the maximum value of jitters anticipated to take place within the rotation system provided for the disc 9.

Figure 5:
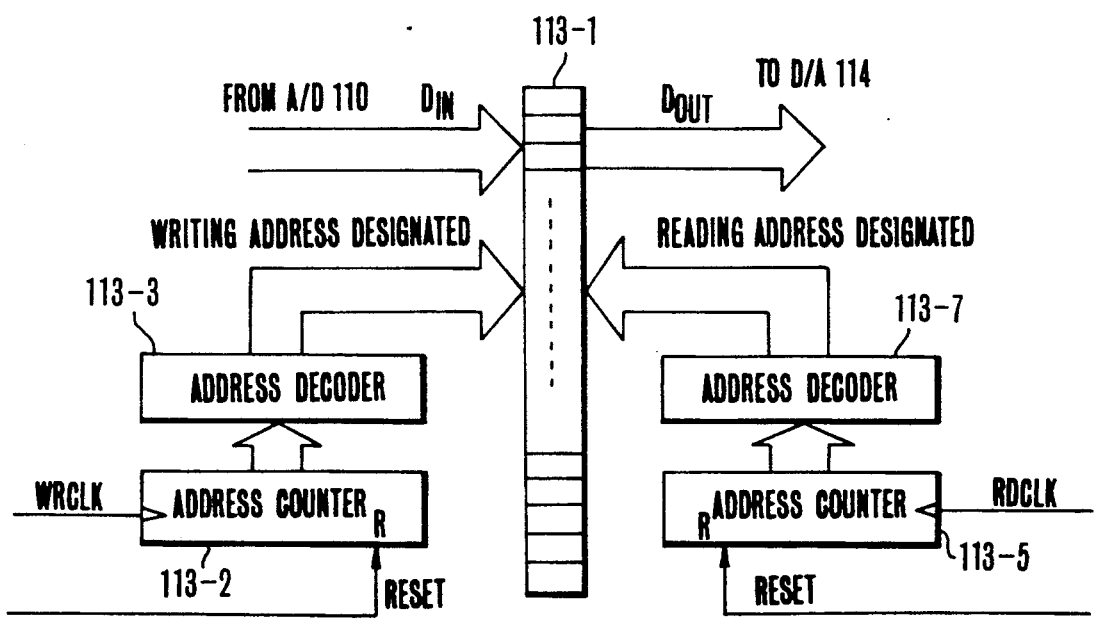
FIG. 5 is a block diagram showing the arrangement of a line memory included in the arrangement of FIGS. 4 and 7.

The details of the line memory 113 employed in this embodiment of the invention are as shown in FIG. 5. Referring to FIG. 5, a memory part 113-1 of the line memory 113 is arranged to have a memory cell capacity which is capable of taking therein the data obtained by sampling, according to the clock signal of 2 fST, the one-horizontal-scanning period (hereinafter referred to as 1 H period) portion of the video signal. A counter 113-2 is arranged to count the number of pulses of the writing clock signal WRCLK and to be reset in response to a reset signal supplied to the reset terminal R thereof. Further, the counter 113-2 is of the cyclic type automatically coming back to the counted value of zero when 1 H period portion of the video signal has been written into the memory part 113-1. A decoder 113-3 is arranged to decode the output of the address counter 113-2 for having access to each of the memory cells of the memory part 113-1 as applicable. The data produced from the A/D converter 110 is written in at an address designated by the decoder 113-3. A counter 113-5 is arranged to count the pulses of the reading clock signal RDCLK. The structural arrangement of the counter 113-5 is similar to that of the counter 113-2. A decoder 113-7 is similar to the address decoder 113-3. The data written at an address designated by the decoder 113-7 is produced and supplied to the D/A converter 114. With the address counter 113-2 reset, the output of the A/D converter 110 is written in at the address of the memory part 113-1 corresponding to the counted value of the pulses of the writing clock signal WRCLK received by the counter 113-2. Then, after the lapse of the above stated offsetting time from resetting of the address counter 113-2, the address counter 113-5 is reset. With the counter 113-5 reset, the data of the address of the memory part 113-1 corresponding to the counted value of the pulses of the reading clock signal RDCLK is sent to the D/A converter 114.

Further, each of the cells of the memory part 113-1 retains the written data even after reading is performed in response to a reading instruction of the address decoder 113-7 until a next writing instruction comes from the address decoder 113-3.

Therefore, with the writing address and the reading address offset relative to each other to an extent corresponding to a given number of addresses by using the line memory of FIG. 5, reading can be performed concurrently with writing. Further, the time base of the reproduced video signal can be corrected by changing the writing clock signal according to the frequency of the sync tip part.

The arrangement of FIG. 4 includes a phase comparator 180 which is, for example, of the set-reset type (an IC called MC4044 manufactured by Motorola, Inc.); a loop filter 182 of a PLL circuit; and a VCXO 184 which is composed of a quartz oscillator. In the case of this embodiment, the phase comparator 180 compares the phase of the writing clock signal with that of the reading clock signal. The writing and reading addresses are thus arranged to be prevented from overlapping each other by controlling the reading and writing clock signals through this phase comparison. In the embodiment, the disc 9 is arranged to be caused to make one turn during each vertical sync period. Therefore, the average value of the clock pulses of the reading clock signal within one vertical sync period is about equal to that of the writing clock signal. The writing and reading addresses of the line memory 113 are arranged to be up counted by one every time the writing clock pulse or the reading clock pulse is received.

Compared with the embodiments using the frame memory, the modified embodiment arranged as shown in FIG. 4 is advantageous with respect to the use of the line memory the cost of which is lower than the frame memory. The latter also permits simplification of circuit arrangement.

Figure 7:
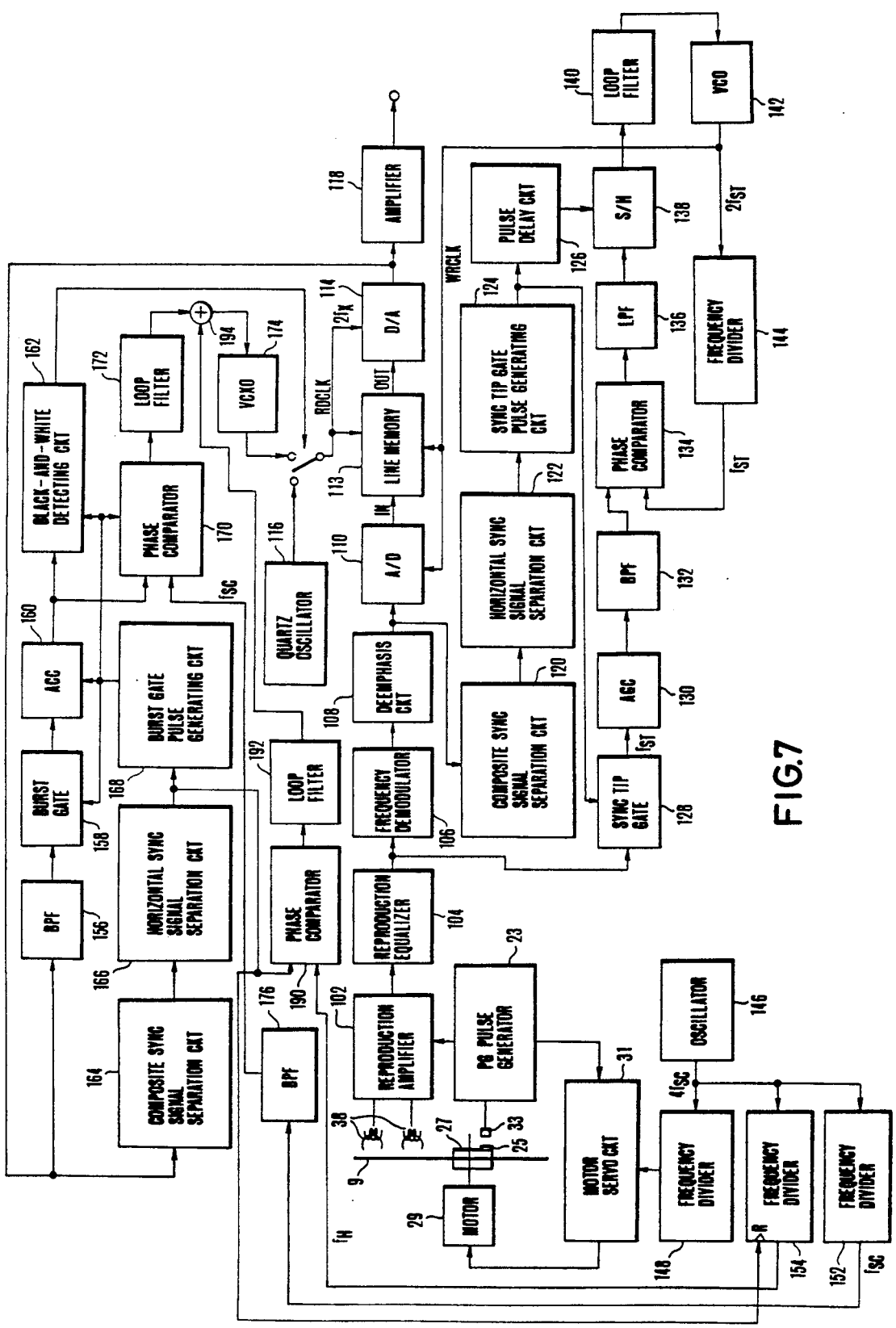

FIG. 7 shows a further modification of the first embodiment. In this case, an arrangement for TBC using the color burst part in reading from the line memory 113 is added to the TBC arrangement of FIG. 4 for reproduction using the line memory 113. The use of the color burst part for TBC is similar to the arrangement described with reference to FIG. 3 and, therefore, the details of it is are omitted from description. In short, this modification differs from the preceding example of modification in respect to the addition of a phase comparator 190, a loop filter 192 and an adder 194. In this case, for forming the vertical sync signal for driving the magnetic disc 9, a frequency divider 154 is arranged to frequency-divide the clock pulses of frequency 4 fsc produced from an oscillator 146 to obtain a reference horizontal sync signal. The reference horizontal sync signal is supplied to the phase comparator 190. The comparator 190 compares the phase of the reference horizontal sync signal formed by the frequency divider 154 with that of the horizontal sync signal included in the video signal produced from the D/A converter 114. An error signal thus obtained as a result of comparison is supplied to the loop filter 192. The output of the loop filter 192 is supplied to the adder 194 to be added to the error signal which is obtained by using the color burst part. The VCXO 174 is controlled by the sum of the error signals.

Under the above stated control, the phase of the reference horizontal sync signal and that of the horizontal sync signal of the video signal produced from the D/A converter 174 are locked in such a way as to prevent the writing and reading addresses of the line memory 113 from overlapping each other. The writing and reading addresses can be prevented from overlapping by the addition of the PLL circuit for the horizontal sync signal, because: In the case of this modification, the recorded magnetic disc 9 is arranged to be rotated in synchronism with a reference vertical sync signal obtained via the frequency divider 148 from the oscillation output of 4 fsc of the oscillator 146 which is provided for obtaining the reference horizontal sync signal. Therefore, even if the horizontal sync signal which is written in the line memory 113 is fluctuating due to uneven rotation of the motor 29, the fluctuating horizontal sync signal is in synchronism with the reference horizontal sync signal as considered on the average taken over one vertical sync period. Accordingly, the arrangement of the modification to synchronize the horizontal sync signal of the reproduced video signal with the above stated reference vertical sync signal indirectly causes the horizontal sync signal obtained in writing and the horizontal sync signal obtained in reading to coincide with each other on the average despite of their fluctuating correlation. This ensures that the writing and reading addresses never come to overlap each other even after the lapse of a given period of time. Without the use of this PLL circuit for the horizontal sync signal, the VCXO 174 is controlled solely by the use of the color burst part. In that event, the VCXO 174 is controlled on the basis of a sampled value obtained only during the color burst period. Therefore, in the event of occurrence of some variations in the reading clock signal during a period other than the color burst period, such reading clock variations cannot be detected. Under such a condition, the writing and reading addresses might come to overlap each other. The method for preventing the writing and reading addresses from overlapping is not limited to the above stated arrangement. The arrangement may be changed to perform control by directly comparing the writing and reading clock signals with each other as mentioned in the foregoing in the description of the modification shown in FIG. 4.

Further, in the case of FIG. 7, the frequency divider 154 is arranged to be reset by means of the horizontal sync signal separated from the video signal produced from the D/A converter 114. This is for removing an initial stationary offset error. The frequency divider 154 is arranged to be reset at the beginning of reproduction. For example, the frequency divider 154 is arranged to be reset by means of a counter which is not shown is arranged to produce just one pulse in response to the output of the horizontal sync signal separation circuit 166 at the start of reproduction and to produce no pulse thereafter even when the output of the circuit 166 is produced. This arrangement ensures an adequate operation of the PLL circuit which is formed for the horizontal sync signal by the phase comparator 190, the loop filter 192, etc. The advantages of the modification is as follows:

The use of the inexpensive line memory like in the case of the arrangement shown in FIG. 4 permits reduction in cost. The circuit arrangement can be simplified. The arrangement shown in FIG. 4 necessitates the loop filter 182 including the VCXO 184 to have a relatively large time constant. As a result, the PLL circuit of FIG. 4 requires a relatively long period of time before a stabilized state of the PLL circuit is obtained. Whereas, in the case of FIG. 7, the period of time required before a stabilized state of the PLL circuit is obtained is relatively short, because: The horizontal sync signal of the video signal read out from the line memory 113 is phase-compared with the reference horizontal sync signal formed by the frequency divider 154 and they are controlled to be phase-locked. This arrangement thus permits the PLL circuit to have a relatively small time constant.

Figure 8:
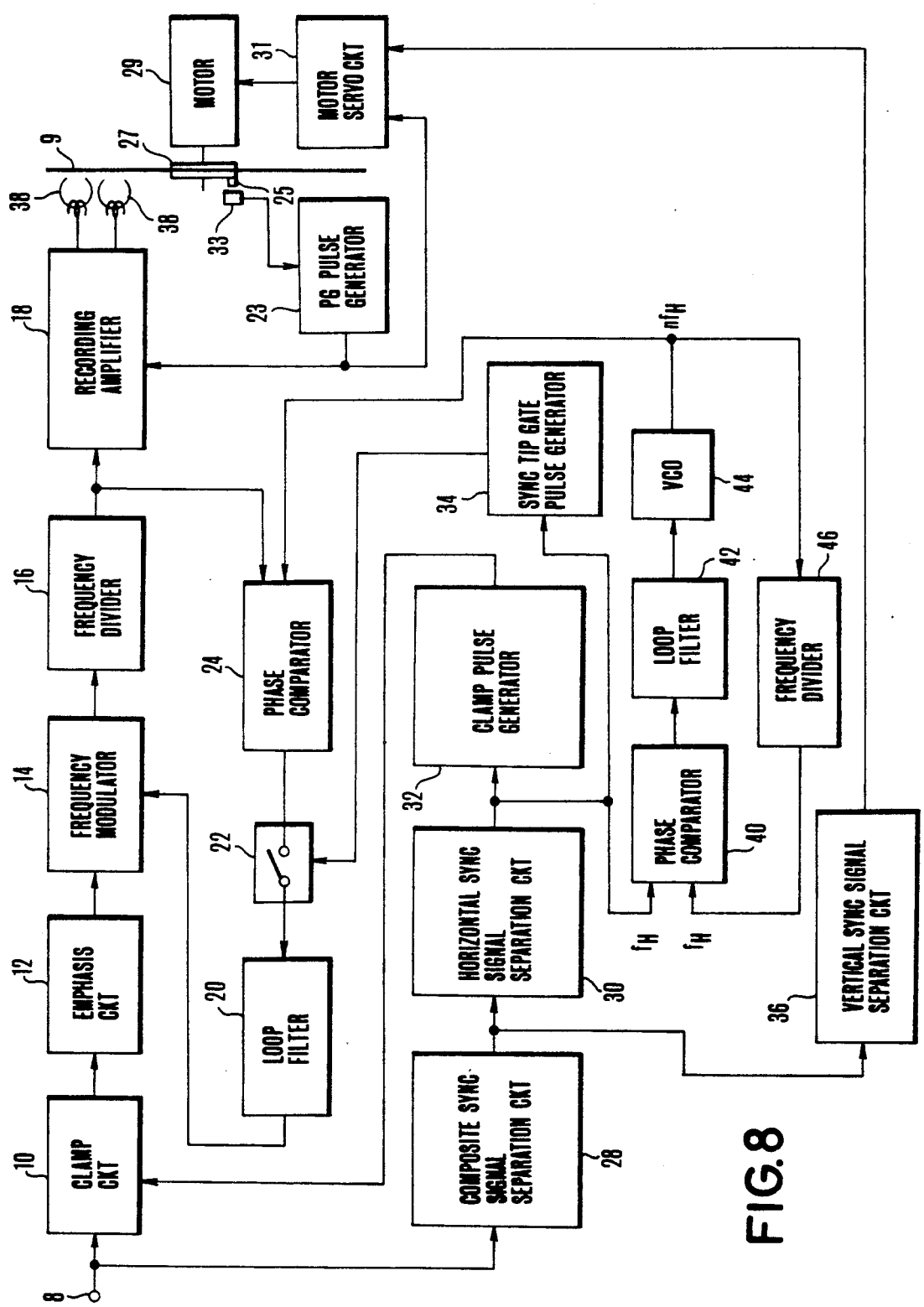
FIG. 8 is a block diagram showing the recording part of a recording/reproducing apparatus arranged as a second embodiment of this invention.

FIG. 8 shows the recording part of a recording/reproducing apparatus which is arranged according to this invention as a second embodiment thereof. In FIG. 8, the same parts as those of FIG. 1 are indicated by the same reference numerals and the details of them are omitted from the following description: Referring to FIG. 8, the illustration includes a phase comparator 40; a loop filter 42 which is included in a PLL circuit; a voltage controlled oscillator (VCO) 44; and a frequency divider 46 which is arranged to divide the frequency of an input signal into 1/n of the frequency.

It is a feature of the second embodiment shown in FIG. 8 that a frequency of n fH (wherein n represents a positive integer and fH represents a horizontal scanning frequency) is selected as the carrier frequency in frequency modulating the sync tip part of the video signal. The recording part of the second embodiment differs from that of the first embodiment in this point. The recording part of the second embodiment operates as described below:

The horizontal sync signal separated by the horizontal sync signal separation circuit 30 is supplied to the phase comparator 40. The phase comparator 40 compares the phase of this signal with that of the output of a frequency divider 46 which is obtained by dividing the oscillation output of the VCO 44 into 1/n of the frequency. As a result, the phase comparator 40 produces an error signal. The phase comparator 40 is preferably of the set-reset type, such as an IC called MC4044 manufactured by Motorola, Inc.. The error signal produced from the phase comparator 40 is supplied to the loop filter 42. After a desired phase correction is made at the filter 42, the VCO 44 is controlled by the signal. By virtue of this control, the horizontal sync signals which are supplied to the phase comparator 40 are phase-locked. Therefore, the signal of the oscillation frequency n fH produced from the VCO 44 is phase-locked to the phase of the horizontal sync signal of the input video signal. The oscillation output of the frequency n fH of the VCO 44 is supplied to another phase comparator 24 to be used as the reference frequency for the frequency of the sync tip part during the process of frequency modulation.

Figure 9:
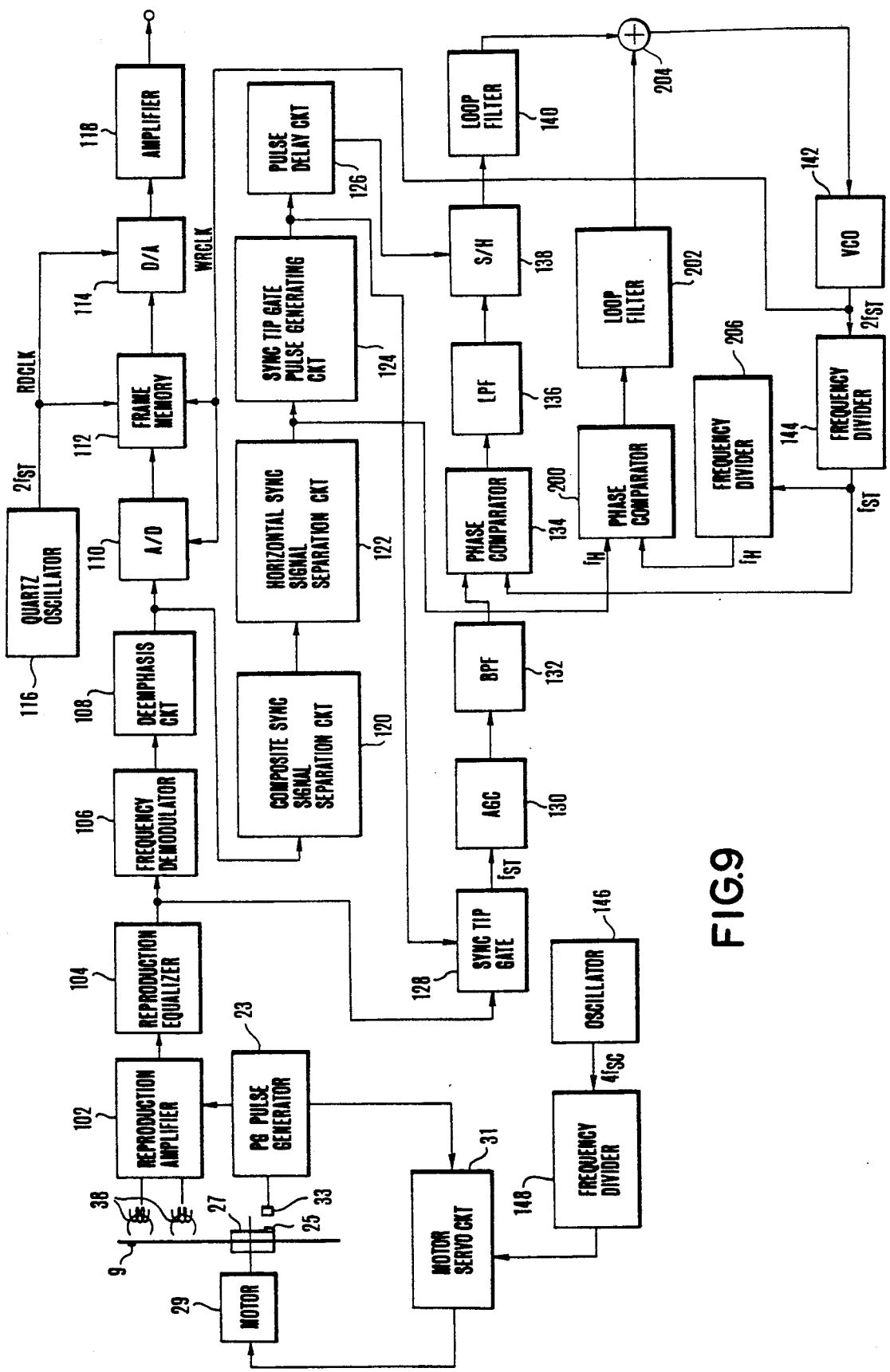
FIG. 9 is a block diagram showing the reproducing part of the embodiment.

It is a feature of the second embodiment that the arrangement of the embodiment obviates the necessity of using the reference oscillator 26 of FIG. 1. It is another feature that the arrangement to have the whole apparatus operate in synchronism with the frequency n fH precludes the possibility of having any noise clock due to the use of the oscillator 26 like in the case of the first embodiment shown in FIG. 1. It is a further feature of the second embodiment that the arrangement to have the frequency of the sync tip part set at a frequency which is phase-locked to be n times as high as the horizontal sync frequency of the input video signal permits the addition of a PLL circuit which is used for the horizontal sync signal during a reproducing operation. This arrangement gives an advantage which is as described below:

The advantage of the second embodiment will become apparent from the following description of the reproducing part which is arranged to reproduce the video signal recorded by the recording part shown in FIG. 8:

FIG. 9 shows the reproducing part of the recording-/reproducing apparatus arranged as the second embodiment of the invention. In FIG. 9, the same blocks as those shown in FIG. 2 are indicated by the same reference numerals and the details of them are omitted from the following description: The reproducing part of FIG. 9 differs from that of FIG. 2 in respect to the addition of the PLL circuit for the horizontal sync signal. The operation of the additional part is as follows: A phase comparator 200 receives from the horizontal sync signal separation circuit 122 a horizontal sync signal which is separated from a reproduced video signal. The comparator 200 compares the phase of this horizontal sync signal with that of a signal obtained by dividing the frequency of the output signal of the VCO 142 into ½ thereof by the frequency divider 144 and by further dividing it into 1/n through another frequency divider 206. The phase comparator 200 produces an error signal according to the result of comparison. The error signal thus obtained is phase-corrected by a loop filter 202 before it is supplied to an adder 204. To the adder 204 is also supplied a phase error signal representing a phase difference between the frequency of the sync tip part of the reproduced FM (frequency modulated) video signal and that of the signal which is obtained by frequency-dividing an output signal of the VCO 142 into ½. The adder 204 adds these two error signals together. A sum error signal thus obtained controls the VCO 142. The addition of the PLL circuit which is arranged in this manner is made possible by the recording arrangement for obtaining the relation of f ST=n fH.

The advantage resulting from the addition of the PLL circuit for the horizontal sync signal is as follows: Unlike a PLL circuit provided for the frequency of the sync tip part, the PLL circuit for the horizontal sync signal is free from the fear of side lock (phase locking -at a wrong frequency) instead of phase control over a sampled value (information exists only at the sync tip part). Therefore, the addition of the PLL circuit for the horizontal sync signal effectively prevents the side lock of the PLL circuit provided for the sync tip part. The reproducing part shown in FIG. 9 thus has an advantage in this point over the reproducing part shown in FIG. 2.

The term "side lock" as used herein means a phenomenon that the PLL circuit effects phase lock at a frequency deviating an integer times from the sampling frequency (coinciding with the horizontal sync frequency in this instance). In the case of FIG. 2, phase lock might take place at a wrong frequency which is 2 (f ST±m fH), wherein m represents an integer.

Figure 10:
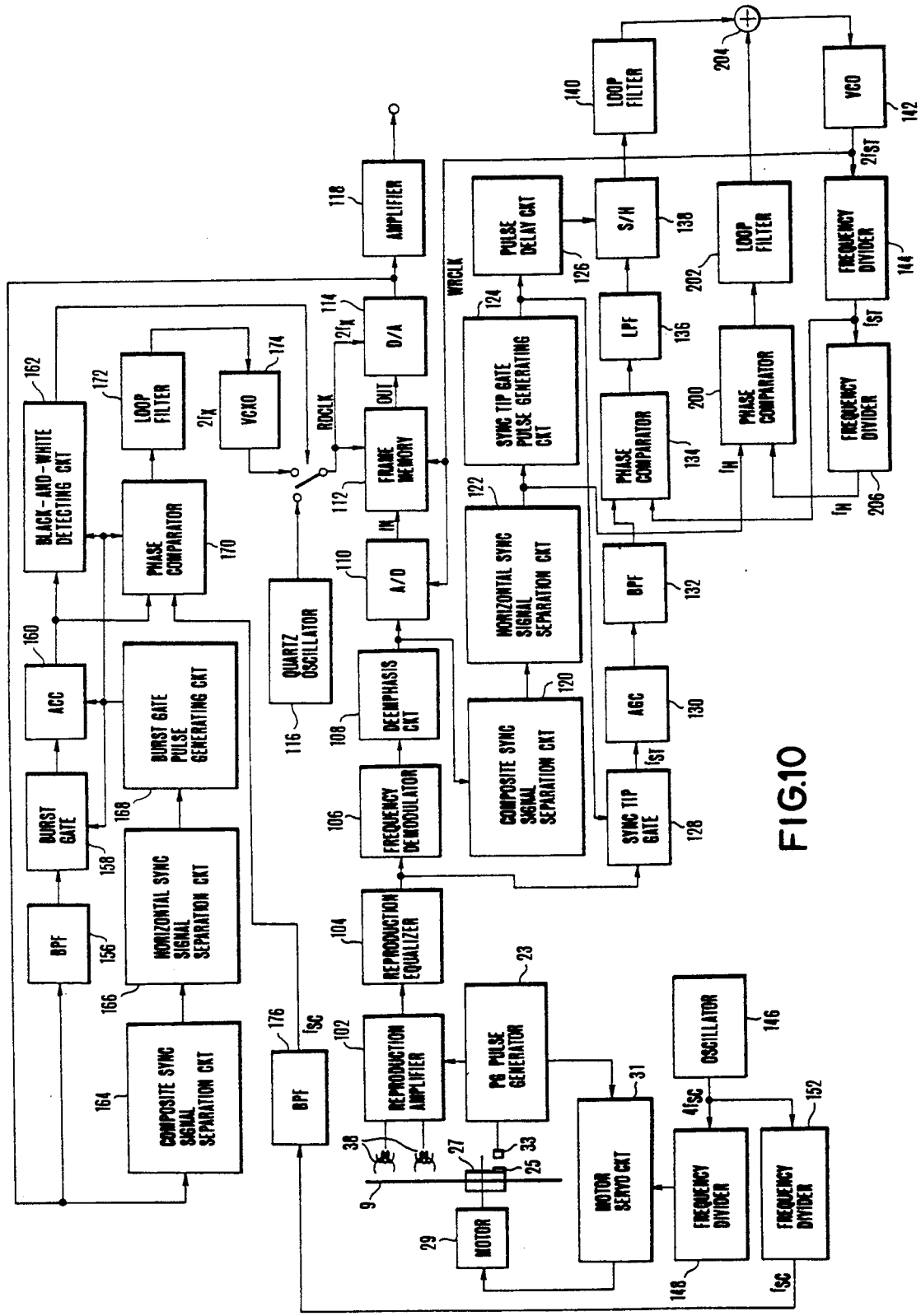
FIGS. 10, 11, 12 and 13 are block diagrams showing example of modification of the embodiment shown in FIG. 9.

FIG. 10 shows a modification of the above stated reproducing part. In this case, another PLL circuit is added to the reproducing part for the color burst part of the video signal. The PLL circuit for the color burst part is arranged in a manner similar to that of FIG. 3.

Figure 11:
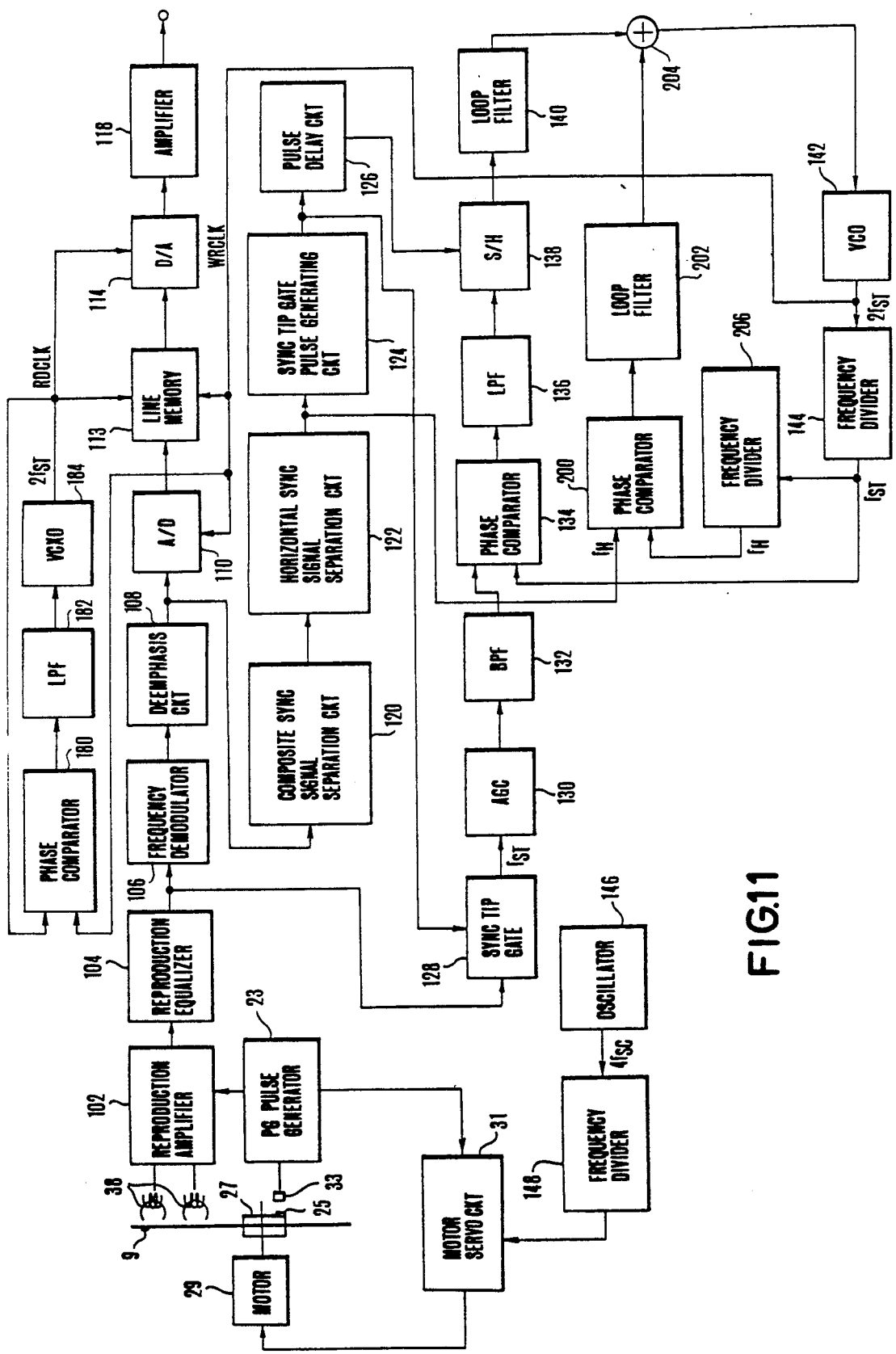

FIG. 11 shows another modification of the reproducing part of the second embodiment. In the case of FIG. 11, the line memory of FIG. 4 is applied to the reproducing part shown in FIG. 9.

Figure 12:
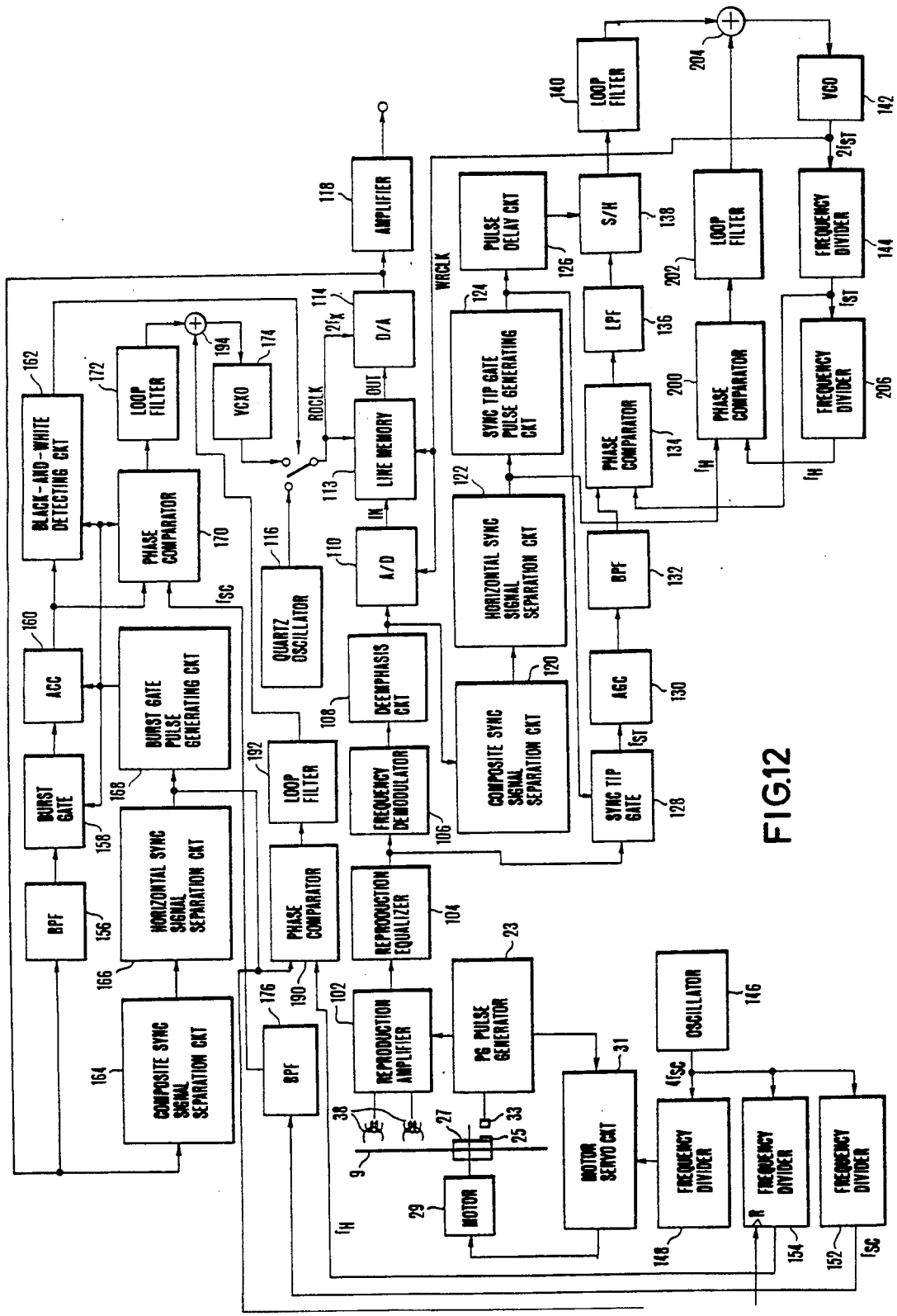

FIG. 12 shows a further modification of the reproducing part of the second embodiment. In this case, the PLL circuit for the color burst part which is arranged as shown in FIG. 7 is applied to the reproducing part shown in FIG. 11.

The operations of the modifications shown in FIGS. 10 to 12 will be understood from the foregoing description and, therefore, require no further description.

Figure 13:
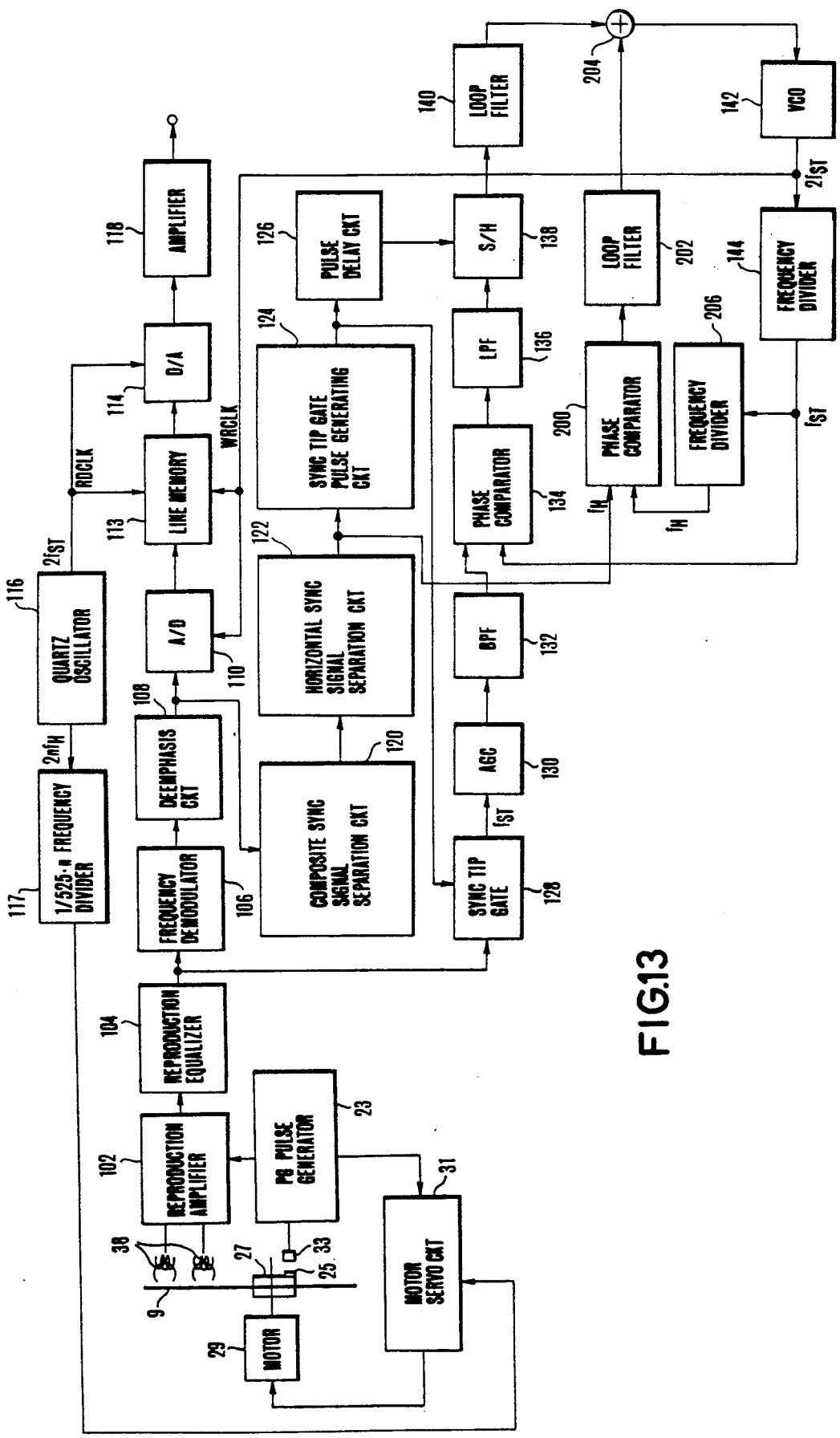

FIG. 13 shows another modification of the reproducing part of the second embodiment. In this case, instead of adding a PLL circuit for the purpose of preventing the writing and reading addresses from overlapping each other, a different method is adopted for the same purpose. In the case of FIG. 13, in view of that the oscillation frequency of the reading clock generating quartz oscillator 116 is 2f ST=2 n fH, a vertical sync signal is obtained by frequency dividing the oscillation output frequency into 1/(525·n) by means of a frequency divider 117 on the basis of a relation of fH=525/2 fv, wherein fv represents a vertical sync frequency. The rotation of the magnetic disc 9 is controlled by the vertical sync signal thus obtained. This arrangement ensures that the reading and writing clock signals are indirectly synchronized with each other via the servo device provided for the rotation of the magnetic disc 9. Therefore, the writing and reading addresses can be prevented from overlapping. This arrangement is of course based on the assumption that recording is performed on the condition of f ST=n fH and thus the vertical sync frequency (=2/525 fH) is in synchronism with f ST during the process of recording.

Further, the arrangement of FIG. 13 not only prevents the problem of side lock (which tends to occur in the arrangement of FIG. 2) but also permits the reproducing part to use a single oscillator in place of two oscillators of FIG. 2 including the oscillator 146 which generates the reference signal for the rotation of the motor 29 and the oscillator 116 which generates the reading clock signal for reading from the frame memory 112. Further, with the two clock signals perfectly synchronized, the arrangement of FIG. 13 prevents any noise that otherwise would result from their mutual interference.

Figure 14:
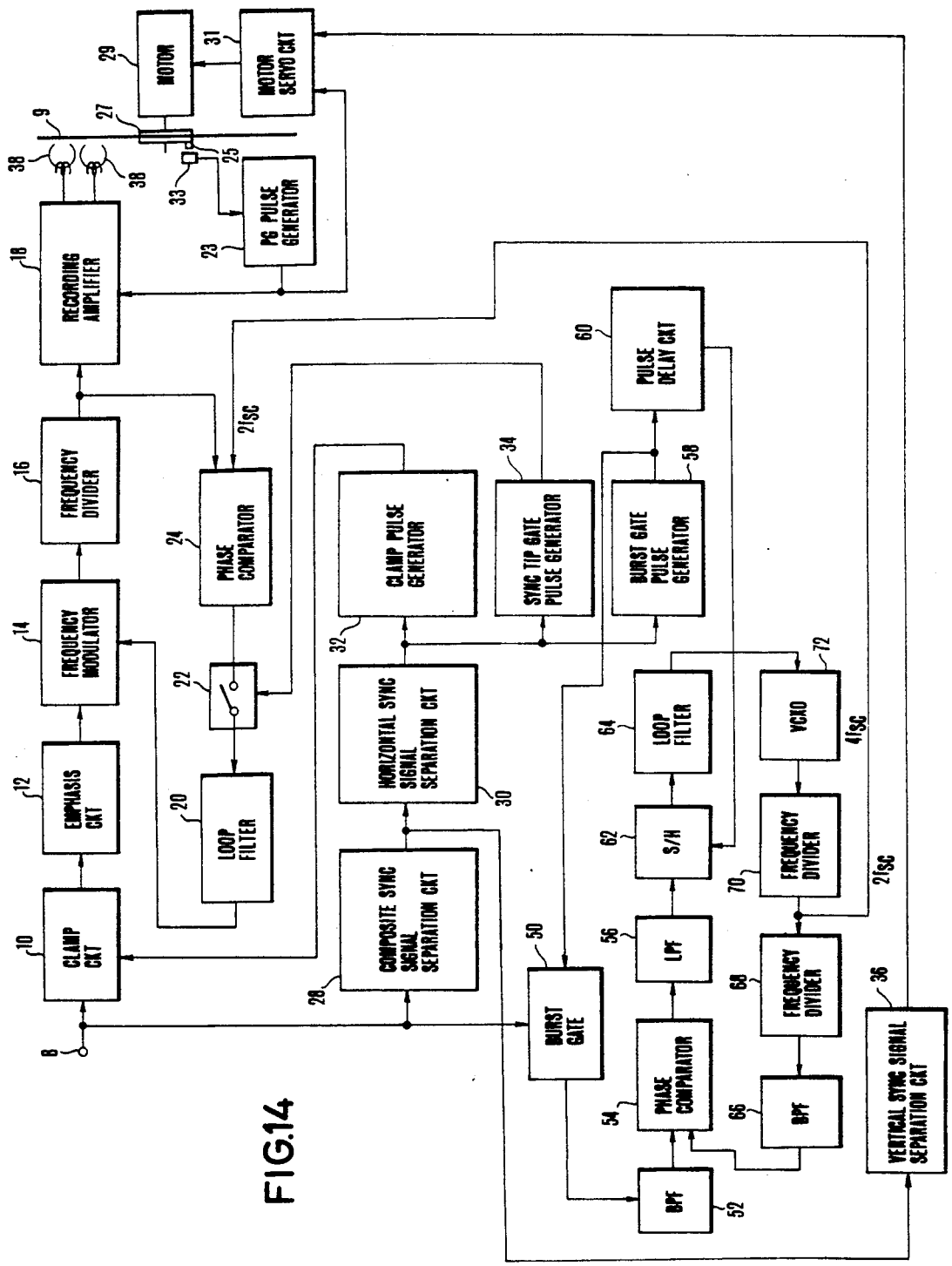
FIG. 14 is a block diagram showing the recording part of a recording/reproducing apparatus arranged as a third embodiment of the invention.

FIG. 14 shows the recording part of a recording/reproducing apparatus which is arranged according to this invention as a third embodiment thereof. The recording part shown in FIG. 14 is arranged to set the sync tip part at a frequency n fsc which is n times as high as the frequency fsc of the color burst part of the input composite video signal. As compared with the second embodiment described in the foregoing, the setting accuracy of the ultimate frequency fst of the sync tip part is increased by the utilization of the color burst part. The details of the arrangement of the recording part shown in FIG. 14 are as follows:

In FIG. 14, the same parts as those of the embodiments described in the foregoing are indicated with the same reference numerals and the details of them are omitted from the following description, which is limited to the points differing from the arrangement of FIG. 8:

With a video signal received at an input terminal 8, a burst gate 50 extracts only the color burst part of the video signal on the basis of a burst gate pulse signal produced from a burst gate pulse generator 58. An unnecessary portion of the signal of the color burst part thus extracted is removed by a BPF 52. The output of the BPF 52 is supplied to a phase comparator 54. The phase comparator 54 is preferably of the double balanced, multiplying type and is arranged to compare the phase of the signal of the color burst part and that of the output of BPF 66. The output of the phase comparator 54 is supplied to an LPF 56 to remove the unnecessary high band component thereof. As a result, the LPF 56 produces a phase error signal. The phase error signal is supplied to a sample-and-hold (S/H) circuit 62 to have a part thereof corresponding to the color burst part sampled and held and supplied to a loop filter 64 which is included in a PLL circuit. The sampling timing of the S/H circuit 62 is controlled by a pulse signal produced from the burst gate pulse generator 58. The burst gate pulse signal is corrected in such a way as to make up for a delay caused by the LPF 56. The error signal which is phase-corrected by the loop filter 64 is supplied to a voltage controlled oscillator (VCXO) 72 which includes a quartz oscillator. The oscillation frequency of the VCXO 72 is thus controlled by the error signal. The oscillation output of the VCXO 72 is supplied to a frequency divider 70 and is further supplied via another frequency divider 68 to the BPF 66. The BPF 66 then shapes the output of the VCXO 72 into a sinusoidal wave and supplies it to the phase comparator 54. A PLL circuit is thus formed by a loop of the phase comparator 54—the LPF 56—the S/H circuit 62—the loop filter 64—the VCXO 72—the frequency divider 70—the frequency divider ,68—the BPF 66—and the phase comparator 54. This PLL circuit thus phase locks the oscillation frequency of the VCXO 72 at a value which is four times as much as the frequency fsc of the color burst part of the input video signal. Meanwhile, a frequency signal of 2 fsc is supplied from the frequency divider 70 to another phase comparator 24. As a result, the frequency of the sync tip part is set at a value 2 fsc.

This value of frequency 2 fsc may be changed to any other value so long as it is an integer times as much as the frequency value fsc. It is an advantage of the third embodiment of the invention that the accuracy of the frequency signal of 2 fsc which is supplied to the phase comparator 24 to be used as a reference input signal for setting the frequency of the sync tip part is enhanced by virtue of the use of the above stated PLL circuit provided for the color burst part.

Figure 15:
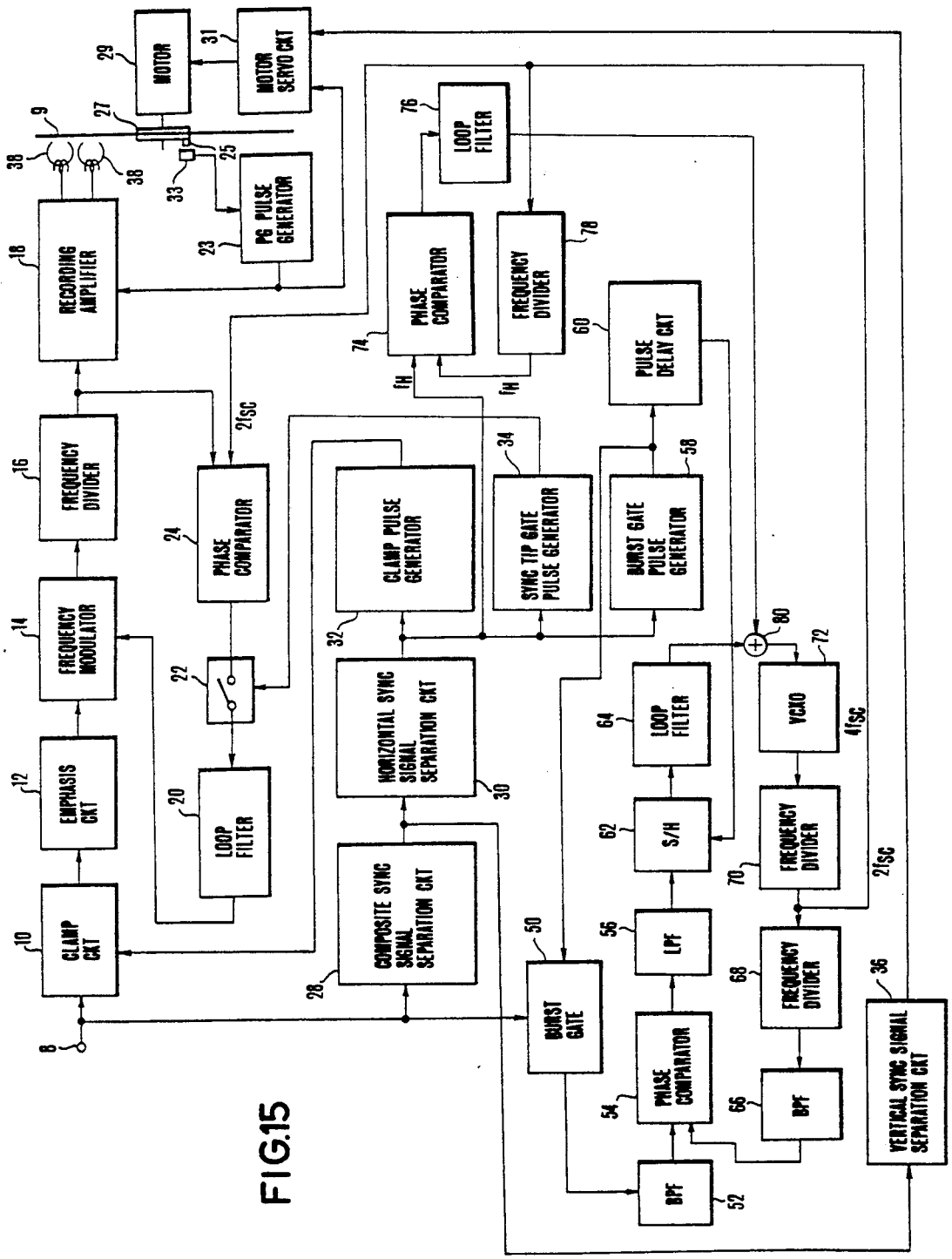
FIG. 15 is a block diagram showing an example of modification of the third embodiment shown in FIG. 14.

FIG. 15 shows an example of modification of the recording part of the third embodiment shown in FIG. 14. The modification differs from the arrangement of FIG. 14 in that a PLL circuit for a horizontal sync signal is added to the arrangement of FIG. 14. This enables the VCXO 72 to produce an oscillation output at a frequency which is 455 times as high as the frequency fH of the horizontal sync signal even in case where the input video signal is a black-and-white signal and thus has no color burst part. Therefore, the frequency fST of the sync tip part can be set at a value fST=455 fH=2 fsc even in the event of a black-and-white input video signal. In the case of the arrangement of FIG. 14, if the input signal is a black-and-white video signal, the VCXO 72 would come to be free running for the lack of any error signal.

The above stated PLL circuit for the horizontal sync signal is arranged as shown in FIG. 15. In FIG. 15, the same parts as those of FIG. 14 are indicated with the same reference numerals and the details of them are omitted from description. The illustration includes a phase comparator 74; a loop filter 76 of the PLL circuit; and a frequency divider 78 which is arranged to divide the frequency of the input signal into 1/455 thereof. The phase comparator 74 compares the phase of the horizontal sync signal separated from the input video signal with that of a signal obtained by frequency-dividing the output of the VCXO 72 into ½ thereof with the frequency divider 70 and by further frequency dividing it into 1/455 thereof with another frequency divider 78. As a result of comparison, the phase comparator 74 produces an error signal. The error signal is phase-compensated through the loop filter 76. The phase-compensated error signal is supplied to an adder 80 to be added to the error signal obtained for the color burst part of the input video signal. In case that the input signal is a color video signal, the error signal which is obtained for the horizontal sync signal and the other error signal for the color bust part cooperate with each other in the VCXO 72 to phase-lock its output to a frequency four times as high as the frequency fsc of the input color burst signal. In the event of a black-and-white input video signal, the error signal for the color burst part is not obtained. However, since the error signal for the horizontal sync signal is still available, the VCXO 72 is phase-locked at a frequency signal of fH×455×2. Such being the arrangement, the phase comparator 24 is supplied with a reference signal of the frequency 2 fsc even in the event of a black-and-white input video signal. Therefore, the frequency of the sync tip part comes to coincide with a frequency signal of fH×455. The VCXO 72 is thus prevented from free running in the event of a black-and-white input video signal. This arrangement of the recording part ensures the adequate function of a PLL circuit provided for the horizontal sync signal within the reproducing part of the apparatus as will be described herein with reference to FIG. 16.

Figure 16:
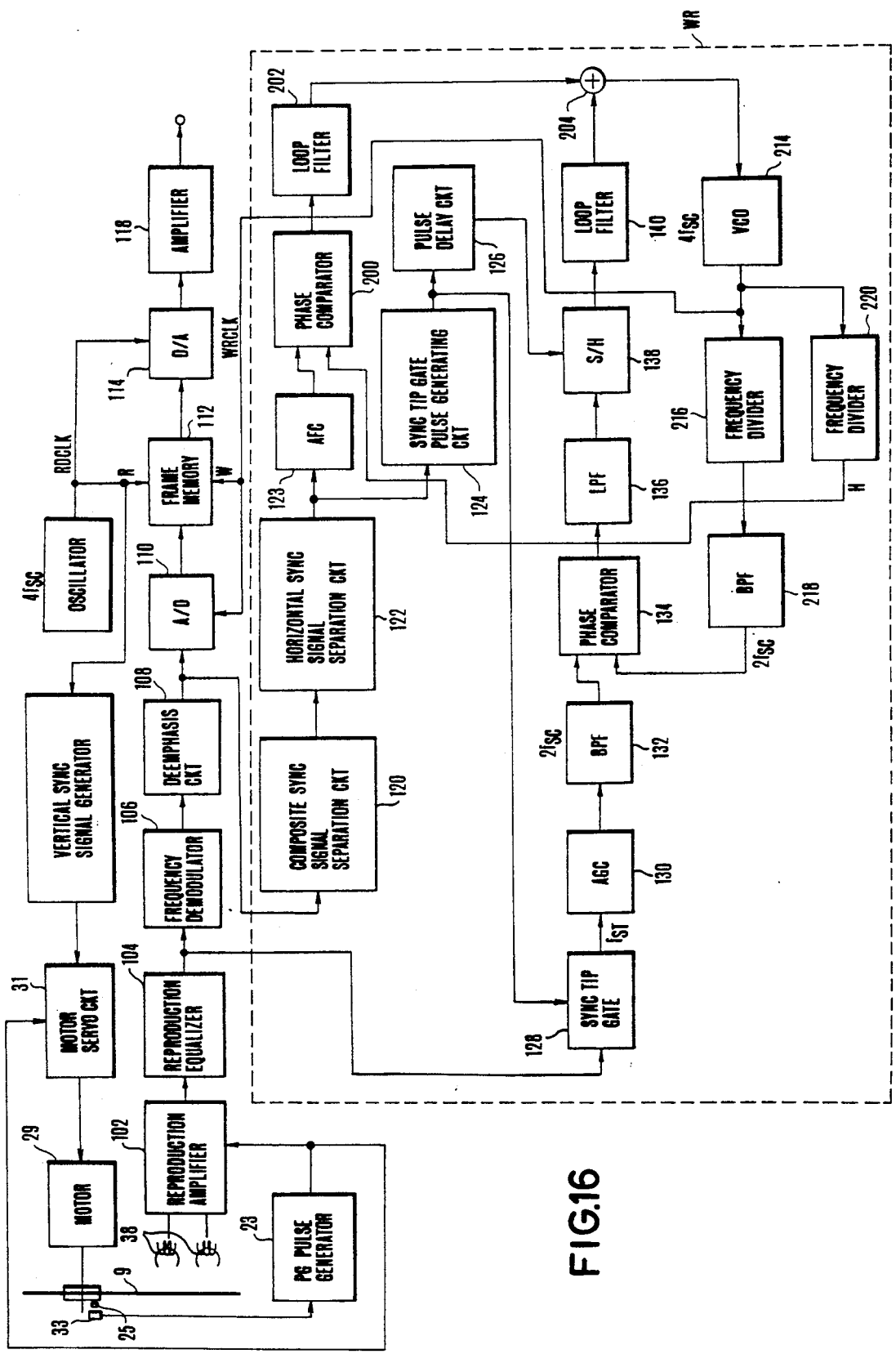
FIG. 16 is block diagram showing the reproducing part of the third embodiment.

FIG. 16 shows the reproducing part of the recording-/reproducing apparatus which is arranged to reproduce the video signal recorded by the recording part described above. The main feature of the reproducing part shown in FIG. 16 as compared with the arrangement of FIG. 9 is as follows: While a specific frequency n fH is used as a reference frequency in the arrangement of FIG. 9, the arrangement of FIG. 16 uses a PLL circuit which sets a reference frequency signal at 2 fsc for the sync tip part of the reproduced video signal. The additional part of the arrangement operates as follows;

A phase comparator 200 compares the phase of a signal obtained by frequency-dividing through a frequency divider 220 the output of a controlled voltage oscillator (VCO) 214 having its center frequency at 4 fsc with that of a horizontal sync signal which is adjusted by an automatic frequency control (AFC) circuit 123. A frequency divider 216 is arranged to frequency-divide the frequency signal of 4 fsc produced from the VCO 214 into ½ thereof. A band-pass filter (BPF) 218 is arranged to have a passing band of 2 fsc.

In the case of this embodiment, a writing clock signal for writing into a frame memory 112 is controlled by using the sync tip part of the video signal which has been modulated into the frequency of 2 fsc. Therefore, a higher degree of accuracy is attainable than a method of applying TBC by using the frequency fsc. Further, the use of PLL circuits including the phase comparators 200 and 134, respectively, effectively prevents the occurrence of the problem of side lock. Further, it is apparent that all parts of FIG. 16 but a writing clock generating circuit WR which is encompassed with a broken line are replaceable as desired with the circuits shown in FIGS. 10, 11 and 12.

Among the examples of embodiment of this invention given in the foregoing, the recording method of the third embodiment is advantageous particularly for an apparatus of the kind including therein a clock signal generating device for generating color subcarrier like in the case of a video camera, because: The recording method is adaptable with a minor degree of modification of the known circuit arrangement.

The term "sync signal part" as used herein for the purpose of this invention includes the signals of the front and rear edges of the sync tip part.

As described in the foregoing, the first embodiment is arranged to reproduce a recorded video signal by phase-comparing a signal corresponding to the sync signal part of the video signal with a reference frequency signal and by correcting time base variations according to the result of phase comparison. Therefore, the first embodiment is capable of adequately correcting the time base variations even in the event of a black-and-white video signal which has no color burst signal.

The second embodiment is arranged to correct the time base variations on the basis of a signal corresponding to the sync signal part. The second embodiment is therefore capable of adequately correcting the time base variations even for a black-and-white video signal which includes no color burst signal. This ensures a higher quality of the reproduced video signal.

Figure 17:
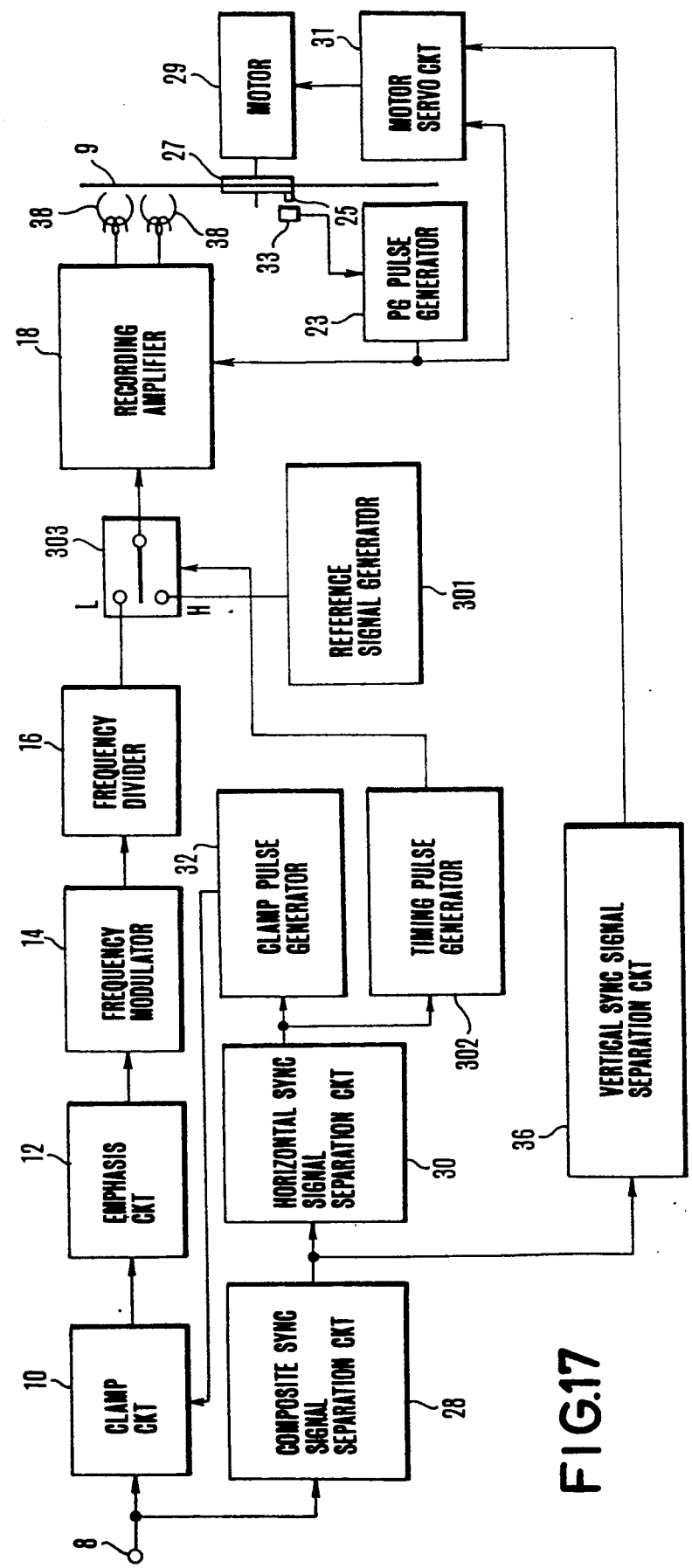
FIG. 17 is a block diagram showing the recording part of a recording/reproducing apparatus arranged as a fourth embodiment of the invention.

A recording/reproducing apparatus which is arranged according to this invention as a fourth embodiment thereof is arranged as described below:

FIG. 17 shows the recording part of the fourth embodiment. In FIG. 17, the same components and parts as those of FIG. 1 are indicated with the same reference numerals and the details of them are omitted from the following description: Referring to FIG. 17, an input signal which is, for example, a composite color video signal and is received at an input terminal 8 is supplied to a clamp circuit 10 to have its horizontal sync signal part (a part A of FIG. 6) clamped to a given DC potential. A clamp pulse signal for this clamping is produced by a clamp pulse generator 32 by first separating a composite sync signal from the input composite color video signal at a composite sync signal separation circuit 28; then by separating a horizontal sync signal from the composite sync signal at a horizontal sync signal separation circuit 30; and by forming clamp pulses at a timing according to the horizontal sync signal.

The input signal which is clamped to the given DC potential by the clamp circuit 10 is processed by an emphasis circuit 12 to have a predetermined frequency characteristic (for example, by raising the level of the high frequency band component of the input signal). The input signal which is thus emphasized is supplied to the input terminal of a frequency modulator 14. In the case of the fourth embodiment, the frequency modulator 14 modulates the signal to have frequency allocation to a degree which is twice as much as a given degree of frequency allocation. After frequency modulation, the frequency-modulated (hereinafter referred to as FM for short) video signal is supplied to a frequency divider 16 to be frequency-divided into ½ of its frequency. This enables the FM video signal to have a desired degree of frequency allocation. In the case of this (the fourth) embodiment, the input video signal is frequency-modulated by the frequency modulator 14 into a frequency which is twice as high as a given frequency and is then frequency-divided into ½ of the frequency by the frequency divider 16. The reason for this is as follows: The subcarrier of the FM video signal has a secondary distortion component (7.16 MHz, if the video signal is a TV signal of the NTSC system, or 8.86 MHs in the event of a TV signal of the PAL or SECAM system). The above stated method of doing frequency division after frequency modulation is first made to a high frequency band is adopted for the purpose of preventing interference between this secondary distortion component and a frequency modulation carrier.

The output of the frequency divider 16 is supplied to one side L of a change-over switch 300. To the other side H of the switch 300 is supplied a reference sync tip frequency signal which is produced from a reference signal generator 301. The position of the change-over switch 300 is arranged to be kept on the side H only for a period of time corresponding to the sync tip part of the video signal by a pulse signal which is generated by a timing pulse generator 302 and is at a high level just for a period of time A as shown in FIG. 6. With the exception of this period, the connecting position of the switch 300 remains on the side L. The length of time during which the change-over switch 300 is on the side H is defined by the timing pulse generator 302 in such a way as to avoid a distorted wave form part resulting from the emphasizing action of an emphasis circuit 12.

A signal which represents the frequency of the sync tip part of the video signal frequency-modulated by the frequency modulator 16 is thus replaced with a reference signal of a given fixed frequency which is generated by the reference signal generator 300. With the signal of the sync tip part thereof thus having been replaced with the signal of the fixed frequency, the FM video signal is supplied to a recording amplifier 18.

The output of the recording amplifier 18 is supplied to a magnetic head 38 to be recorded on a magnetic disc 9. The details of recording timing control over the magnetic head 38 are omitted from description. It goes without saying that, in recording, the magnetic disc 9 is rotated in synchronism with a vertical sync signal which is separated from the input composite video signal by a vertical sync signal separation circuit 36.

The reproducing part of the recording/reproducing apparatus which is the fourth embodiment of this invention is arranged in the same manner as the first, second and third embodiments described in the foregoing and, therefore, is omitted from description.

As described in the foregoing, the fourth embodiment of the invention is arranged to record a standard or reference frequency signal in place of a signal representing the sync signal part of the video signal. This arrangement enables the apparatus to adequately correct time base variations even in cases where the video signal includes no color burst signal.

Figure 18:
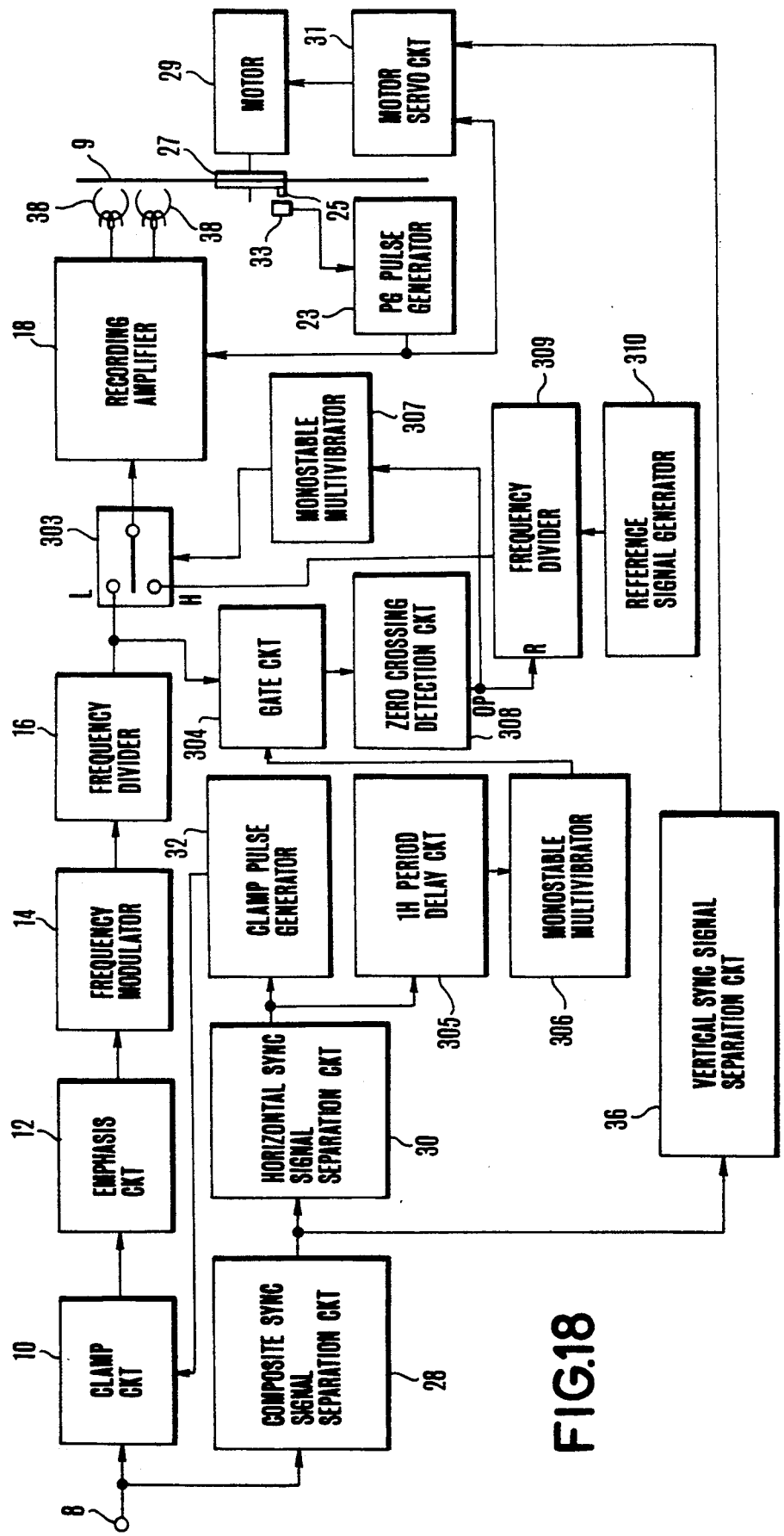
FIG. 18 is a block diagram showing the recording part of a recording/reproducing apparatus arranged as a fifth embodiment of the invention.

FIG. 18 shows the recording part of a recording/reproducing apparatus arranged as the fifth embodiment of the invention. In FIG. 18, the same components and parts as those shown in FIG. 17 are indicated with the same reference numerals and the details of them are omitted from description. The illustration includes a change-over switch 303; a gate circuit 304; a horizontal sync (H) period delay circuit 305; monostable multivibrators 306 and 307; a zero-crossing detection circuit 308; a frequency divider 309; and a reference signal generator 310.

A feature of the fifth embodiment as compared with the fourth embodiment lies in that: While a signal substituting for the sync tip part of the frequency-modulated video signal is arranged to be kept continuous to other parts of the video signal by switching, a frequency of a value n fH is selected, in frequency modulating the video signal, to be the frequency of the sync tip part. The fifth embodiment differs in this point from the fourth embodiment shown in FIG. 17. The fifth embodiment operates as follows: The frequency-modulated (FM) video signal obtained through the frequency divider 16 is supplied to one side L of the change-over switch 303 and to the gate circuit 304. The gate circuit 304 is arranged to open its gate just for a period during which a signal coming from the monostable multivibrator 306 is at a high level. With the gate opened, the FM video signal is supplied to the zero-crossing detection circuit 308. The connecting position of the change-over switch 303 normally remains on the side L. The position of the switch 303 is shifted to and remains on the other side H thereof for a period of time during which the monostable multivibrator 307 produces a high level signal with a zero-crossing detection pulse Op produced from the zero-crossing detection circuit 308.

Further details of the operation of the fifth embodiment are as follows: With a composite video signal received at an input terminal 8, a horizontal sync signal is separated from the signal through a composite sync signal separation circuit 28 and a horizontal sync signal separation circuit 30. The separated horizontal sync signal is supplied to a clamp pulse generator 32 and a 1-H period delay circuit 305.

The 1H period delay circuit 305 delays the horizontal sync signal for one H period. The fall of the horizontal sync signal delayed by and produced from the 1H period delay circuit 305 causes the monostable multivibrator 306 to produce a high level signal and to supply it to the gate circuit 304 for one sync tip period. Meanwhile, the gate circuit 304 receives also the FM video signal which is obtained in the same manner as in the case of the fourth embodiment. Further, the gate circuit 304 is arranged to supply the FM video signal to the zero-crossing detection circuit 308 just for the period during which the signal produced from the mono stable multivibrator 306 is at a high level. Therefore, the zero-crossing detection circuit 308 is receiving a signal corresponding to the sync tip part of the FM video signal. The zero-crossing detection circuit 308 then detects the polarity of the FM video signal by integrating the signal. The circuit 308 detects either a rise or a fall of the wave form of the signal and produces the zero-crossing detection pulse Op at a first zero-crossing timing of, for example, the rising wave part. The pulse Op is supplied to the monostable multivibrator 307 and the frequency divider 309. The zero-crossing detection circuit 308 may be arranged to produce the zero-crossing detection pulse Op at the zero-crossing timing of the falling wave part instead of that of the rising wave part. The frequency divider 309 receives from the reference signal generator 310 a reference or standard signal of frequency m fsc (m: an integer larger than 2). The divider 309 frequency-divides this signal into n/m thereof (n: a positive integer) to obtain thereby a reference signal of a frequency n fsc, which is supplied to one side H of the change-over switch 303.

Further, the zero-crossing detection pulse Op from the zero-crossing detection circuit 308 is arranged to be supplied also to the above stated frequency divider 309 to reset the operation of the divider 309 at the input timing of this pulse. More specifically, the frequency divider 309 includes a counter and is arranged to permit a signal to be formed continuously with the FM video signal by resetting the operation thereof at the zero-crossing timing of the FM video signal. In this instance, the continuity of the signal can be accurately maintained by arranging the reference signal produced from the reference signal generator 310 to have a high frequency.

The monostable multivibrator 307 which is receiving the above stated zero-crossing detection pulse Op produces a high level signal for one sync tip period at the input timing of the zero-crossing detection pulse Op. As mentioned in the foregoing, the operation of the change-over switch 303 is controlled by the signal produced from the monostable multivibrator 307. The connecting position of the switch 303 is on one side H thereof for a period of time, i.e. one sync tip period, during which the signal is at a high level. Therefore, during the period which corresponds to the sync tip part of the FM video signal produced from the above stated frequency divider 16, the video signal is allowed to be supplied to the recording amplifier 18 in a state of being partly replaced, in a continuous wave form, with the signal which is formed jointly by the above stated reference signal generator 310 and the frequency divider 309 at a stable frequency. After that, the video signal is recorded on a magnetic disc 9 in the same manner as in the case of the fourth embodiment.

The reproducing part of the recording/reproducing apparatus arranged as the fifth embodiment of the invention is similar to those of the first, second and third embodiments described in the foregoing and, therefore, requires no further description.

In replacing the sync tip part of the video signal with a signal of a predetermined frequency, the method adopted by the fifth embodiment ensures that the predetermined frequency signal is substituted for the sync tip part of the video signal in a state of having its wave form kept to be continuous with other frequency modulated parts of the video signal. Therefore, in the case of reproduction, frequency demodulation can be accomplished without wave form disturbance at the substituted- points. In this embodiment, each sync signal part includes not only the sync tip part but also front and rear edge signal parts of the sync tip part. Further, in accordance with the arrangement of this embodiment, TBC can be applied on the basis of a signal corresponding to the sync signal part even to such a video signal that has no color burst signal. Therefore, the embodiment ensures reproduction of the video signal with a higher degree of quality.

In a composite color video signal such as a color TV signal of the NTSC system, for example, a luminance signal is frequency-multiplexed, in an interleaved state, with a chrominance signal which is formed with a color subcarrier signal (3.58 MHz) quadrature-two-phase-modulated by two color difference signals (R-Y and B-Y). In recording the composite color video signal by directly frequency-modulating it, a moiré disturbance tends to result from interference between the above stated color subcarrier signal and the lower side-band of the frequency modulated color video signal as a color burst signal which corresponds to the the color subcarrier is added to the composite video signal. During the process of reproduction, this might deteriorate the color video signal.

Figure 19:
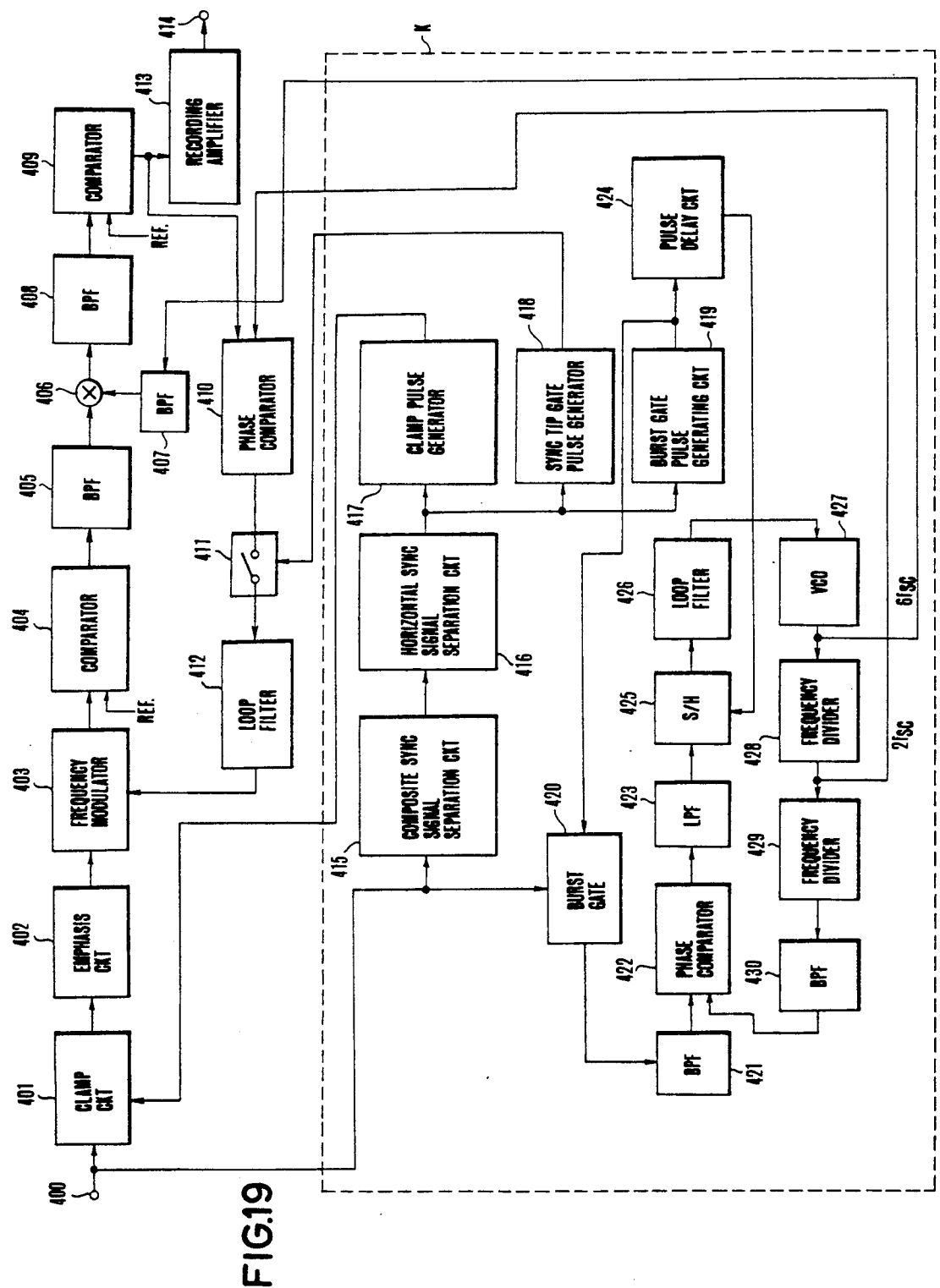
FIG. 19 is a block diagram showing the recording part of a recording/reproducing apparatus arranged as a sixth embodiment of the invention.

A sixth embodiment of this invention is arranged to solve the above stated problem. FIG. 19 shows the recording part of a recording/reproducing apparatus which is arranged according to the invention as the sixth embodiment thereof. Referring to FIG. 19, an input terminal 400 is arranged to receive a composite color video signal such as a color TV signal of the NTSC system. A clamp circuit 401 is arranged to clamp the level of the sync tip part of the input video signal to a given level. A reference numeral 402 denotes an emphasis circuit. A voltage-to-frequency converter 403 is arranged to have two control inputs and serves as a frequency modulator. A comparator 404 is arranged to decrease the secondary distortion of the wave form of a frequency modulated (FM) video signal. A band-pass filter (BPF) 405 is arranged to remove an unnecessary frequency band prior to frequency conversion. A numeral 406 denotes a multiplier. Another BPF 408 is arranged to allow to pass only a specific band after frequency conversion. A comparator 409 is provided for removal of the secondary distortion. The illustration further includes a phase comparator 410; a switch 411; a loop filter 412 for a PLL circuit; and a recording amplifier 413. An output terminal 414 is arranged to produce a recording FM video signal and is connected to a magnetic head which is not shown.

A composite sync signal separation circuit 415 is arranged to separate a composite sync signal from the video signal supplied to the input terminal 400. The illustration includes a horizontal sync signal separation circuit 416; a clamp pulse generator 417; a sync tip gate pulse generator 418; a burst gate pulse generator 419; and a burst gate 420.

A BPF 421 is arranged to allow the predetermined band of a color burst part to pass there. An LPF 424 is arranged to take out only a phase error signal. A pulse delay circuit 424 is arranged to produce a sample-and-hold pulse by delaying a burst gate pulse. FIG. 19 further includes a sample-and-hold (S/H) circuit 425; a loop filter 426 for a PLL circuit; a voltage controlled oscillator (VCO) 427; a frequency divider 428 which is arranged to divide the frequency of the input signal into $\frac{1}{3}$ thereof; a frequency divider 429 which is arranged to divide the frequency of the input signal into $\frac{1}{2}$ thereof; a BPF 430 which is arranged to shape the output of the frequency divider 429 into a sinusoidal wave form. The recording part of the recording/reproducing apparatus which is arranged in this manner operates as described below:

In FIG. 19, a part K which is encompassed with a broken line represents a part for producing control signals. More specifically, the part K forms, from the composite color video signal received at the input terminal 400, a predetermined clamp pulse signal; a sync tip gate pulse signal which determines a sync tip part; a clock signal of a frequency 6 fsc which is phase locked to the subcarrier of the color burst part; and a clock signal of a frequency 2 fsc which is phase-locked to the color burst subcarrier. The details of the operation of this part K are as described below:

The composite sync signal obtained from the composite sync signal separation circuit 415 is supplied to the horizontal sync signal separation circuit 416. The circuit 416 separates and produces the horizontal sync signal. Then, on the basis of the horizontal sync signal, the clamp pulse generating circuit 417 generates the clamp pulse signal; the sync tip gate pule generating circuit 418 generates the sync tip gate pulse signal; and the burst gate pulse generating circuit 419 generates the burst gate pulse signal. The burst gate 420 takes out only a color burst part from the input composite color video signal supplied to the input terminal 400 on the basis of the burst gate pulse signal from the burst gate pulse generating circuit 419. The signal of the color burst part thus extracted is supplied to the BPF 421 to have its unnecessary band portion removed therefrom. The color burst part signal is then supplied to the phase comparator 422. The phase comparator 422 which is preferably a double balanced modulator type compares the phase of the color burst part with that of the output of the BPF 430. The output of the phase comparator 422 is applied to the LPF 423 to have its unnecessary high band portion removed therefrom. The output of the LPF 423 thus obtained is a phase error signal. The phase error signal is supplied to the sample-and-hold (S/H) circuit 425. The S/H circuit 425 then samples and holds a part of the phase error signal corresponding to the color burst part. The sampled output of the S/H circuit 425 is supplied to the loop filter 426 of the PLL circuit. The sampling timing of the S/H circuit 425 is determined by the burst gate pulse signal which has been corrected by the pulse delay circuit 424 to make up for a delay caused by the LPF 423. The error signal which has been phase-corrected by the loop filter 426 is supplied to the voltage controlled oscillator (VCO) 427 and serves to control the oscillation frequency of it. The oscillation output of the VCO 427 is supplied to the frequency divider 428 and is further applied via another frequency divider 429 to the BPF 430. The BPF 430 then shapes the oscillation output into a sinusoidal wave form. The sinusoidal wave output thus obtained then comes back to the phase comparator 422. The PLL circuit which consists of a loop of the phase comparator 422—the LPF 423—the S/H circuit 425— the loop filter 426—the VCO 427—the frequency divider 428—the frequency divider 429—the BPF 430—the phase comparator 422 causes the oscillation frequency of the VCO 427 to be phase-locked to a value six times as much as the input color burst part frequency fsc.

The composite color video signal supplied to the input terminal 400 is clamped at the clamp circuit 401 by means of the clamp pulse signal which is produced from the clamp pulse generating circuit 417 disposed within the part K. After clamping, the video signal is supplied to the emphasis circuit 402 to be emphasized there. The emphasized input composite color video signal is supplied to the frequency modulator 403 to be frequency modulated there. If the frequency allocation obtained at the time of recording is as shown at a part "a" in FIG. 20, the frequency allocation obtained at the time of the frequency modulation is as shown at a part "b" with the conversion carrier assumed to be at the frequency of 6 fsc.

After completion of the process of frequency modulation, the FM (frequency-modulated) video signal is supplied to the comparator 404 to have the secondary distortion component thereof removed there. At the same time, the energy of the fundamental wave component of the video signal is emphasized. The output of the comparator 404 is supplied to the BPF 405 to remove its unnecessary band portion (a portion below 21.5 MHz, as there is very little amount of harmonic content of the carrier of 3.58 MHz). As a result, there remains only the fundamental wave component as shown at the part "b" in FIG. 20. The output of the BPF 405 is supplied to the multiplier 406 to be multiplied by the signal obtained by shaping into a sinusoidal wave form the signal of 6 fsc which is obtained from the VCO 427 included in the part "K" in synchronism with the color burst part. As a result, there are obtained an FM video signal component having the frequency allocation for recording as shown at the part "a" in FIG. 20 and a component other than that component. Then, the FM video signal component ("a" of FIG. 20) is alone extracted from these components by means of the BPF 408. The FM video signal component thus extracted is supplied to the comparator 409. The comparator 409 serves to amplify the energy of the FM video signal and also to lessen the secondary distortion thereof. The output of the comparator 409 is supplied to the phase comparator 410. The phase comparator 410 then phase-compares the output of the comparator 409 with the clock signal of frequency 2 fsc which is obtained from the frequency divider 428 disposed within the part K in synchronism with the color burst signal. As a result of phase comparison, the comparator 410 produces an error signal. The error signal is supplied to the switch 411. The switch 411 is arranged to be closed for a period of time corresponding to the sync tip part by the sync tip gate pulse signal produced from the sync tip gate pulse generating circuit 418 included in the part K. The switch 411 allows the error signal to be taken out therefrom only during that period. The error signal thus taken out is supplied to the loop filter 412 of the PLL circuit to undergo a predetermined correcting process. After that, the corrected error signal is fed back to the correction input terminal of the frequency modulator 403. The FM video signal produced from the comparator 409 is thus accurately fixed at the frequency of 2 fsc which is in synchronism with the color burst part. The FM video signal is supplied from the comparator 409 to the recording amplifier 413 and is further supplied to a magnetic head which is not shown to be recorded on a magnetic disc which is employed as a recording medium. Further, the magnetic head, the magnetic disc, a disc rotating device and a control device for the disc rotation are all arranged in the same manner as in the case of other embodiments described in the foregoing and, therefore, require no further description.

Figure 21:
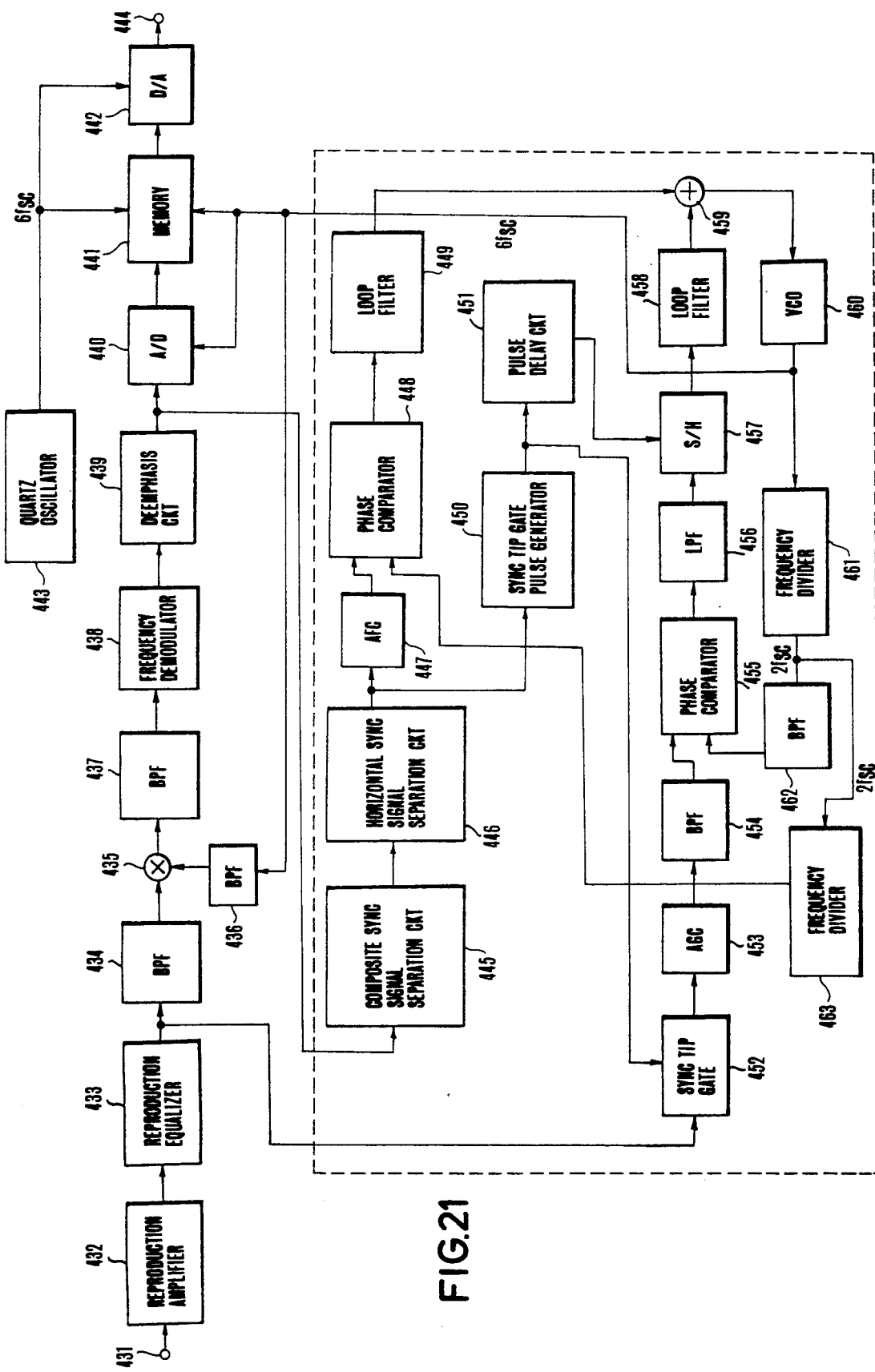
FIG. 21 is a block diagram showing the reproducing part of the sixth embodiment.

The reproducing part of the recording/reproducing apparatus embodying the invention as the sixth embodiment thereof is arranged as described below:

FIG. 21 shows the arrangement of the reproducing part. An input terminal 431 is arranged to receive a reproduced FM video signal reproduced by a magnetic head which is not shown from a magnetic disc which is also not shown. The reproducing part includes a reproduction amplifier 432; a reproduction equalizer 433; a BPF 434 which is arranged to remove an unnecessary band portion of the video signal prior to frequency conversion; a multiplier 435; a BPF 436; another BPF 437 which is arranged to allow only a predetermined band to pass there after frequency conversion; a frequency demodulator 438; a deemphasis circuit 439; an A/D converter 440; a memory 441; a D/A converter 442; a quartz oscillator 443 for generating a reading clock signal; and an output terminal 444 for the reproduced composite video signal.

In FIG. 21, a part "L" which is encompassed with a broken line is arranged to produce a clock signal of 6 fsc phase-locked to the frequency of 2 fsc which includes time base variations of the sync tip part of the reproduced FM video signal. The clock signal of 6 fsc is obtained from both the reproduced FM video signal and the frequency demodulated reproduced video signal.

The part "L" includes a composite sync signal separation circuit 445; a horizontal sync signal separation circuit 446; an automatic frequency control (AFC) circuit 447; a phase comparator 448; a loop filter 449 which is included in a PLL circuit; a sync tip gate pulse generating circuit 450; a pulse delay circuit 451 which is arranged to sample-and-hold the pulse signal by delaying it for a given period of time; a sync tip gate 452; an automatic gain control (AGC) circuit 453; a BPF 454 which is arranged to allow to pass only a portion of the video signal in the proximity of the component of frequency 2 fsc which is the frequency modulated frequency of the sync tip part of the video signal; a phase comparator 455; an LPF 456 which is arranged to take out only a phase error signal; a sample-and-hold (S/H) circuit 459; the loop filter 458 of a PLL circuit; an adder 459; a voltage controlled oscillator (VCO) 460; a frequency divider 461 which is arranged to divide the frequency of an input signal into ⅓ thereof; a BPF 462 which is arranged to shape into a sinusoidal wave form a clock signal produced from the frequency divider 461; and a frequency divider 463 which is arranged to divide the frequency of an input signal into 1/455 thereof and is provided for the purpose of forming a horizontal sync signal frequency from the clock signal of 2 fsc.

The part "L" of FIG. 21 operates as follows: From the reproduced FM (frequency-modulated) video signal produced from the reproduction equalizer 433, a part corresponding to the sync tip part thereof is extracted by the sync tip gate 452. The extracting timing is determined by a sync tip gate pulse signal which is generated by the sync tip gate pulse generator 450 in the following manner: First, a composite sync signal is separated by the composite sync signal separation circuit 445 from the demodulated video signal which has been deemphasized by the deemphasis circuit 439. Then, a horizontal sync signal is separated by the horizontal sync signal separation circuit 446 from the composite sync signal. Then, the sync tip gate pulse generator 450 generates the sync tip gate pulse signal from the horizontal sync signal.

The sync tip part of the reproduced FM video signal is alone extracted through the sync tip gate 452. After that, the extracted signal is controlled to have a given amplitude by the AGC circuit 453 and is then supplied to the BPF 454. Unnecessary noises are removed by the BPF 454. The sync tip part of the reproduced FM video signal thus processed is supplied as a reference input to the multiplying type phase comparator 455.

The phase comparator 455 compares the phase of the comparison signal fed back from the PLL circuit with that of the reproduced reference signal and produces an error signal. Since the phase comparator 455 is of the multiplying type, the error signal includes some unnecessary high band component. Therefore, the high band component is removed by a LPF 456. The output of the LPF 456 is supplied to the S/H circuit 457. The S/H circuit 457 samples and holds a portion of the output of the LPF 456 corresponding to the sync tip part. The sample-and-hold timing of the S/H circuit 457 is determined by the sync tip gate pulse signal which is produced from the sync tip gate pulse generator 450. In order that the optimum part of the error signal is sampled and held, the timing of the sync tip gate pulse is adjusted by means of the pulse delay circuit 451.

The phase of the sampled error signal is corrected by the loop filter 458 of the PLL circuit. The phase-corrected error signal is sent to the adder 459 to be added to another error signal, which is obtained from another loop filter 449 in a manner as will be described later. The sum of them is sent to the VCO 460. The oscillation frequency of the VCO 460 is set at 6 fsc.

The oscillation frequency of the VCO 460 is changed to increase or decrease from 6 fsc by the error signal produced from the adder 459. The output of the VCO 460 is sent to the frequency divider 461 to be frequency-divided into ⅓ thereof. The signal of 2 fsc which is thus obtained by frequency divider 461 is sent via the BPF 462 to the phase comparator 455. The PLL circuit which consists of a loop of the phase comparator 455—the LPF 456—the S/H circuit 457—the loop filter 458—the adder 459—the VCO 460—the frequency 461—the BPF 462—and the phase comparator 455 thus causes the VCO 460 to have its oscillation frequency 6 fsc phase-locked to the frequency signal of 2 fsc which includes the time base variations of the sync tip part of the reproduced FM video signal received at the input terminal 431. The output signal of the VCO 460 which is obtained in this manner is supplied to the BPF 436 as the frequency conversion carrier for the multiplier 435; to the A/D converter 440 as a timing clock signal; and to the memory 441 as a writing clock signal. This enables the memory 441 to store a digital video signal which includes no jitters.

Next, a circuit arrangement for obtaining an error signal which comes from the loop filter 449 to the adder 459 is described as follows: The phase comparator 455 receives the horizontal sync signal which is separated from the reproduced video signal through the composite sync signal separation circuit 445, the horizontal sync signal separation circuit 447 and the AFC circuit 446 and compares the phase of this signal with that of a signal which is obtained by dividing the frequency of the output of the VCO 460 into ⅓ thereof through the frequency divider 461 and by further dividing it into 1/455 through the frequency divider 463. In this manner, a PLL circuit is formed for obtaining a horizontal sync signal which is synchronized with the reproduced FM video signal. An error signal which is thus obtained as a result of comparison is phase-compensated through the loop filter 449 before it is supplied to the adder 459. At the adder 459, the phase error signal indicative of a phase difference between the frequency of the sync tip part of the reproduced FM video signal and the signal of 2 fsc obtained by dividing the output frequency of the VCO 460 into ⅓ thereof is added to the above stated error signal which is produced from the loop filter 449. The VCO 460 is controlled by an error signal which is obtained from the adder 459 as the result of addition. The addition of the PLL circuit which operates according to the horizontal sync signal to the circuit arrangement of the reproducing part becomes possible by virtue of the recording arrangement made to record the video signal by maintaining the relation of fST (sync tip part frequency)=n·fH (horizontal sync frequency).

Figure 20:
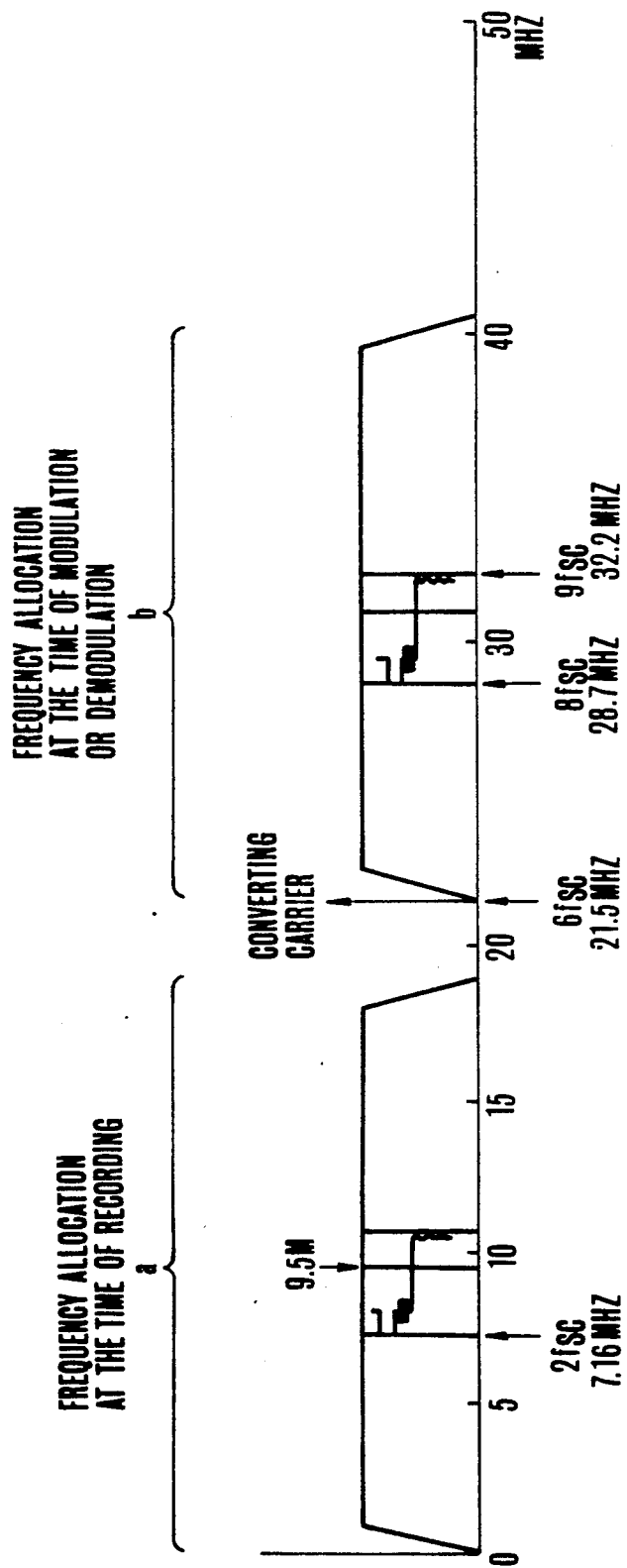
FIG. 20 shows the frequency allocation of a frequency modulated video signal obtained by the sixth embodiment shown in FIG. 19.

After the reproduced FM video signal which is received at the input terminal 431 is amplified by the reproduction amplifier 432, the signal is supplied to the reproduction equalizer 433 to undergo a prescribed correction process there and is then supplied to the BPF 434 to have an unnecessary band component other than the component "a" in FIG. 20 removed therefrom. The output of the BPF 434 is sent to the multiplier 435. At the multiplier 435, the video signal is multiplied by a signal which is obtained by shaping into a sinusoidal wave, through the BPF 436, the frequency output of 6 fsc of the VCO 460 obtained within the part "L" in synchronism with the reproduced sync tip part frequency of 2 fsc. As a result of multiplication, an FM video signal component which is as shown at the part "b" in FIG. 20 is obtained along with other components. Then, the FM video signal component ("b" of FIG. 20) is alone taken out by the BPF 437 and is supplied to the frequency demodulator 438. The frequency demodulator 438 demodulates the reproduced FM video signal "b" of FIG. 20. The demodulated signal is sent to the deemphasis circuit 439. The reproduced video signal is deemphasized and is then sent to the A/D converter 440 to be converted into digital data which consists of, for example, eight bits per sample. The digital data is written into the memory 441. In this instance, a conversion clock signal of frequency 6 fsc which is produced from the VCO 460 within the part "L" in synchronism with the reproduced sync tip part frequency of 2 fsc is used for the A/D conversion. This clock signal of 6 fsc is also used as a writing clock signal for writing into the memory 441. This arrangement ensures that any time base variations of the reproduced video signal is absorbed when this signal is written into the memory 441.

The content of the memory 441 is read out according to a clock signal of a fixed frequency of 6 fsc which is obtained from the reference quartz oscillator 443 and is sent to the D/A converter 442, which operates also under the control of the same clock signal of the fixed frequency of 6 fsc. Then, an analog signal is produced from the D/A converter 442 to be sent to the output terminal 444. It goes without saying that a composite color video signal thus produced from the output terminal 444 is free from time base variations by virtue of the time base correcting operation described above.

While the sixth embodiment is arranged to use the conversion carrier of 6 fsc for the FM video signal, this conversion carrier may be replaced with a conversion carrier of 12 fsc.

Figure 22:
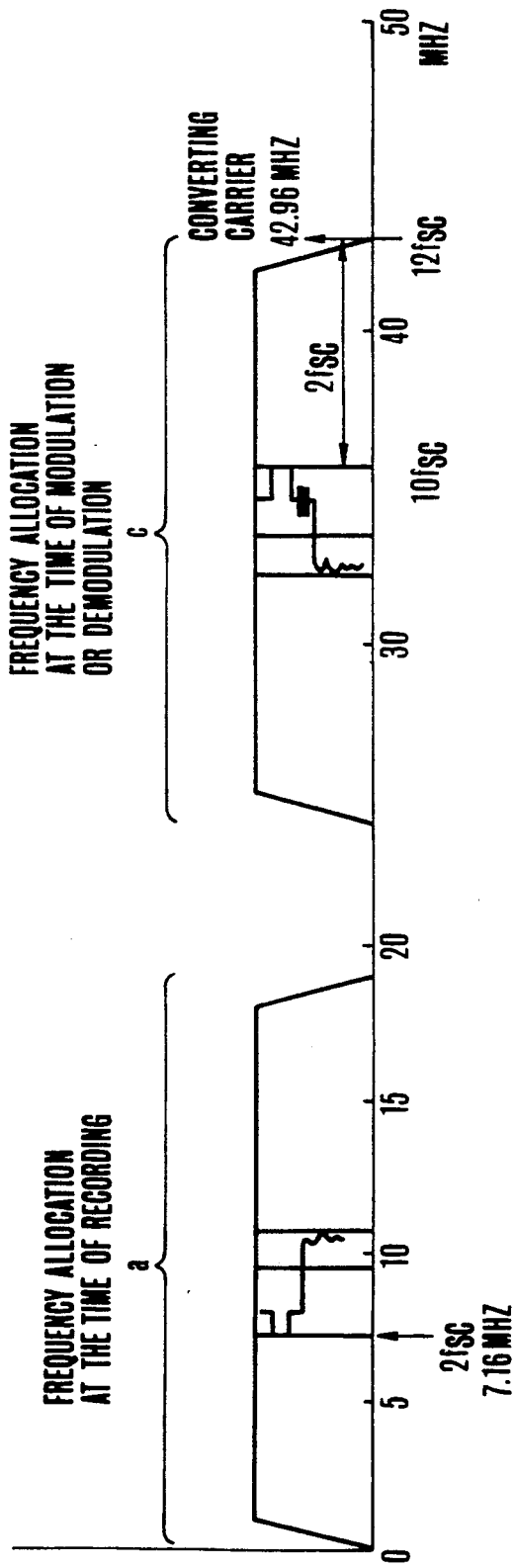
FIG. 22 shows the frequency allocation of a frequency modulated video signal obtained by the embodiment shown in FIG. 21.

In the case of that modification, the frequency allocation obtained at the time of modulation or demodulation becomes as shown at a part "c" in FIG. 22. Changes in the circuit arrangement required for the modification are as follows:

In the circuit arrangement of FIG. 19: An inverting amplifier is additionally provided in between the emphasis circuit 402 and the frequency modulator 403. The frequency divider 428 is changed to divide the frequency of the input signal into 6/1 thereof. Further, the filters are changed as necessary.

In the circuit arrangement of FIG. 21: An inverting amplifier is additionally provided in between the frequency demodulator 438 and the deemphasis circuit 439. The frequency divider 461 is changed to divide the frequency of the input signal into 1/6 thereof; and the filters are changed as necessary.

The operation of the modification is similar to that of the sixth embodiment and, therefore, requires no further description.

Further, the sixth embodiment is arranged to set the frequency of the frequency conversion carrier at n fsc and that of the sync tip part at frequency m fsc. However, these frequency values of course may be changed respectively to 1 fH and p fH or to q fv and h fv, wherein fH represents the horizontal sync frequency of the input signal, fv the vertical sync frequency of the input signal and n, m, l, p, q and h positive integers respectively.

In accordance with the arrangement of the sixth embodiment described, the base band component of the modulation signal and the side-band wave component of the FM video signal are very clearly separated in terms of frequency during recording, so that the moiré resulting from interference which takes place between them during frequency modulation can be lessened. During reproduction, the base band component of the reproduced signal and the side-band wave component of the demodulated video signal after frequency conversion are also very clearly separated in terms of frequency, so that the moiré resulting from interference which takens place between them during frequency demodulation also can be lessened.

The frequency fsc of the reproduced FM video signal, the frequency conversion carrier and the sync tip part of the FM video signal are in a phase-locked relation. Therefore, even if moiré results from interference among them, the moiré appears in a fixed pattern on the picture plane of a monitor or the like when the reproduced signal is displayed thereon. Besides, the lessened moiré presents no problem for visual sensations. Besides, since the moiré component is then in a fixed pattern, it is easily removable by means of some filter that utilizes the correlativity of the image signal, such as a comb-shaped filter.

Figure 23:
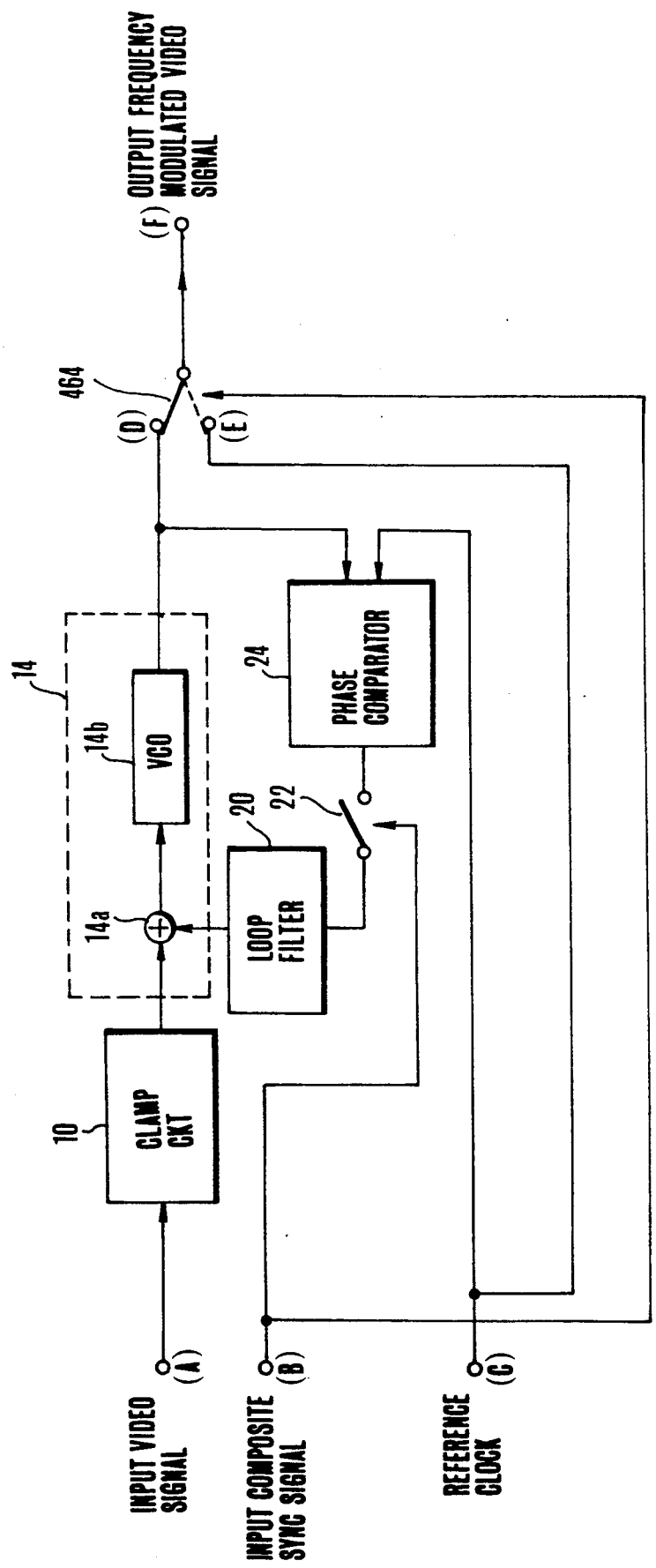
FIG. 23 is a block diagram showing an example of modification of the first embodiment shown in FIG. 1.

The recording part of the first embodiment may be modified in such a way as to enable the frequency carrier signal of the sync tip part of the video signal to be usable as reference for time base correction to be accomplished during reproduction by phase-locking the frequency modulation carrier to a reference clock signal during the process of frequency modulation in recording the video signal. An example of such modification is arranged as described below:

FIG. 23 shows in a block diagram the arrangement of the above stated modification of the first embodiment shown in FIG. 1. In FIG. 23, the same components and parts as those of FIG. 1 are indicated with the same reference numerals and the details of them are omitted from description. In the case of FIG. 23, the input video signal received by an input terminal (A) can be clamped at its sync tip part or pedestal part by a clamp circuit 10. Then, the video signal which has the DC level of the sync tip part or the pedestal part fixed by the clamp circuit 10 is supplied to a frequency modulator 14. The frequency modulator 14 is composed of an adder 14a and a voltage controlled oscillator (VCO) 14b. The video signal which is clamped by the clamp circuit 10 comes via the adder 14a to the VCO 14b. The VCO 14b frequency-modulates the video signal by producing a signal which has a frequency corresponding to the voltage level of the video signal. The frequency modulated video signal is supplied to one terminal (D) of a change-over switch 464 and is also to one of the input terminals of a phase comparator 24.

To the other input terminal of the phase comparator 24 is supplied a reference clock signal which is produced from, for example, the quartz oscillator 26 of FIG. 1. As a result of comparison, the phase comparator 24 produces an error signal, which is supplied to the voltage control terminal of the VCO 14b via a switch 22, a loop filter 20 and 20 and the adder 14a. Meanwhile, a composite sync signal which is separated from the video signal received at the input terminal (A) is supplied to the switch 22 via the input terminal (B). The switch 22 closes at the sync tip parts of the horizontal and vertical sync signals included in the composite sync signal and equalization pulses.

Therefore, during a period of time corresponding to each sync tip part of the input video signal coming to the input terminal (A), the above stated arrangement forms a PLL circuit which causes the frequency of the sync tip part of the frequency modulated video signal to be of the same frequency as that of the above stated reference clock signal coming from the input terminal (C). With the exception of this specific period, the frequency modulator 14 performs frequency modulation in an ordinary manner and the output thereof is supplied to the input terminal (D) of the switch 464.

Meanwhile, to the other input terminal (E) of the switch 464 is also supplied the reference clock signal which comes from the input terminal (C). The switching action of the switch 464 is controlled by the composite sync signal coming through the input terminal (B). During a period of time corresponding to the sync tip part of the video signal coming to the input terminal (A), the connecting position of the switch 464 is on the side of the input terminal (E) thereof. With the exception of this period, the position of the switch 464 is always on the other side of the input terminal (D). By this switching action, the FM (frequency-modulated) video signal has the sync tip part thereof replaced with the above stated reference clock signal before it comes to be produced from an output terminal (F).

Further, in replacing the sync tip part of the signal with the reference signal, the switch 22 is operated during the replacing process in such a way as to have the oscillation output of the VCO 14b phase-locked to the reference signal. Therefore, the wave form of the FM video signal produced from the output terminal (F) is never disturbed before and after the switch-over of the connecting position of the switch 464 from the terminal (E) to the terminal (D). This arrangement thus ensures that, at the time of reproduction, the wave form of a reproduced video signal obtained through a frequency demodulation process will remain undisturbed.

Figure 24:
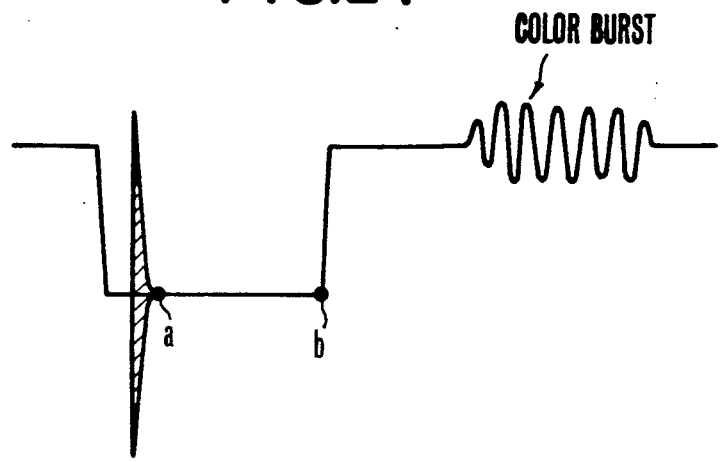
FIGS. 24 and 25 show the wave forms obtained at the sync tip part of a reproduced video signal.
Figure 25:
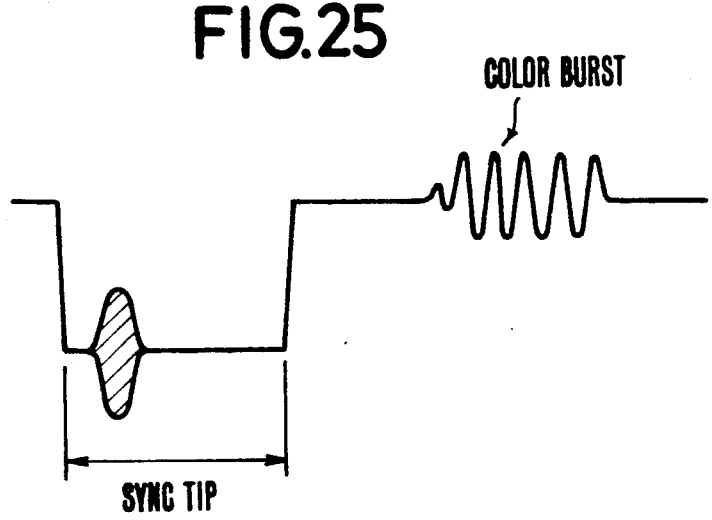

Referring to FIG. 24, a hatched part shows a wave form disturbance taking place within the sync tip part. Such wave form disturbance results from a phase discrepancy which tends to occur between wave forms obtained before and after change-over of the position of the switch 464 from the terminal (D) to the terminal (E) thereof during recording. FIG. 25 shows the wave form of a reproduced video signal obtained by the reproducing part of the first embodiment shown in FIG. 2. Compared with the wave form of FIG. 25, the wave form disturbance at the sync tip part shown in FIG. 24 is greater (in level). However, in terms of the length of time, the latter is smaller. Meanwhile, a response delay time in making the frequency of the sync tip part constant is longer than the response delay time of the frequency modulator 14. Therefore, the wave form disturbance of FIG. 24 gives longer period between points of time "a" and "b" during which TBC can be performed for reproduction than the wave form disturbance of FIG. 25. In actuality, the wave form disturbance which takes place for a certain length of time is attributable to the influence of a filter which is not shown but is included in the frequency modulator 14.

Further, although the wave form disturbance of the sync tip part shown in FIG. 24 is larger than in the case of the reproducing part of the first embodiment shown in FIG. 2, the temporal length of it is shorter. Besides, the occurring position of it is unvarying. Therefore, the wave form disturbance is easily removable by, for example, replacing this part with some other suitable signal or by a clamping process.

Figure 26:
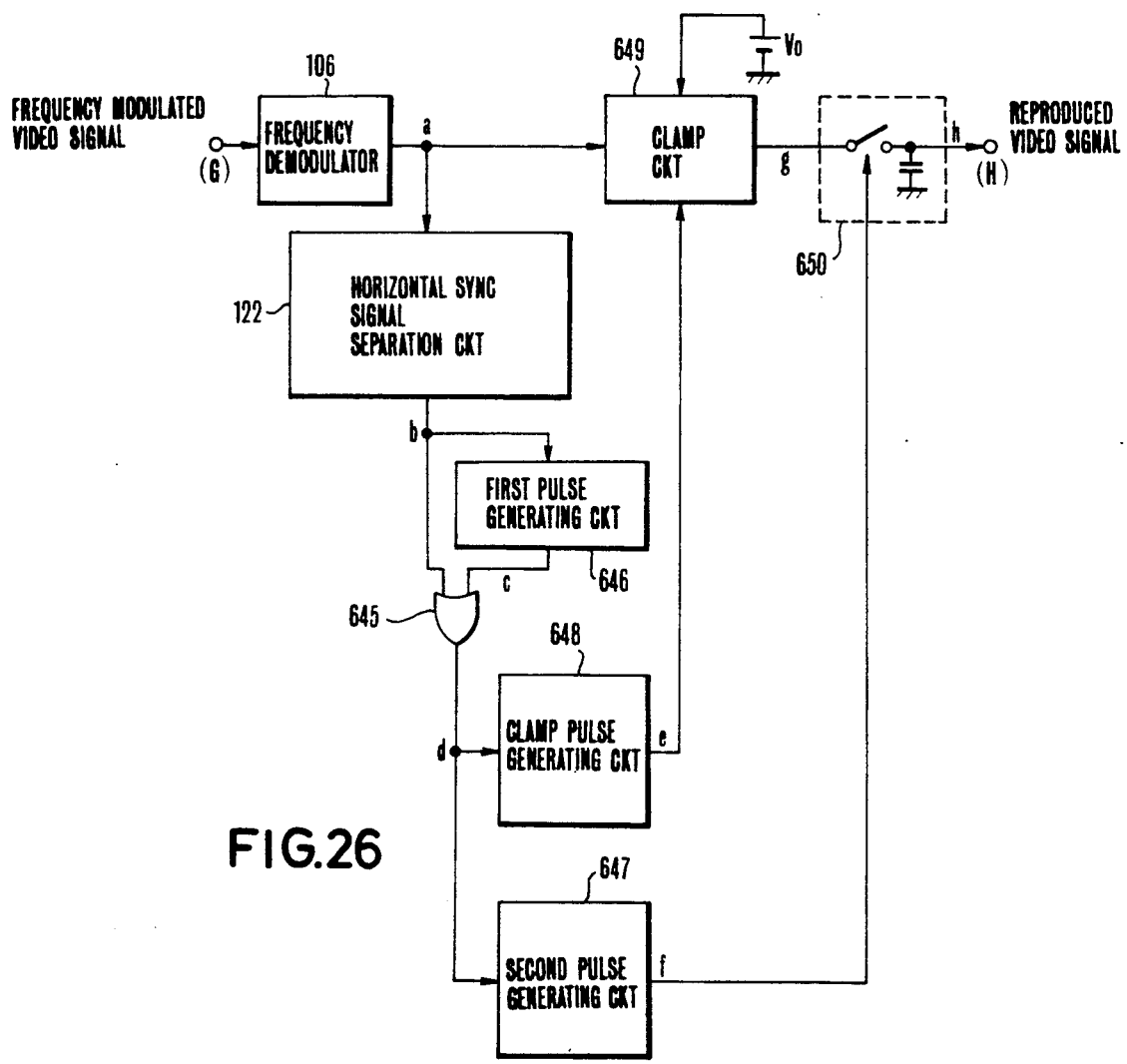
FIG. 26 is a block diagram showing a circuit arrangement for removal of a wave form disturbance occurring at the sync tip part of the reproduced video signal shown in FIG. 24.

FIG. 26 shows by way of example a circuit arrangement for removing the wave form disturbance of the sync tip part of the reproduced video signal shown in FIG. 24. In FIG. 26, the same components and parts as those shown in FIG. 2 are indicated with the same reference numerals and the details of them are omitted from description. The illustration includes a frequency demodulator 106; a horizontal sync signal separation circuit 122; an OR gate 645; first and second pulse generating circuits 646 and 647; a clamp pulse generating circuit 648; a clamp circuit 649; a reference voltage Vo; and a sample-and-hold (S/H) circuit 650.

Figure 27:
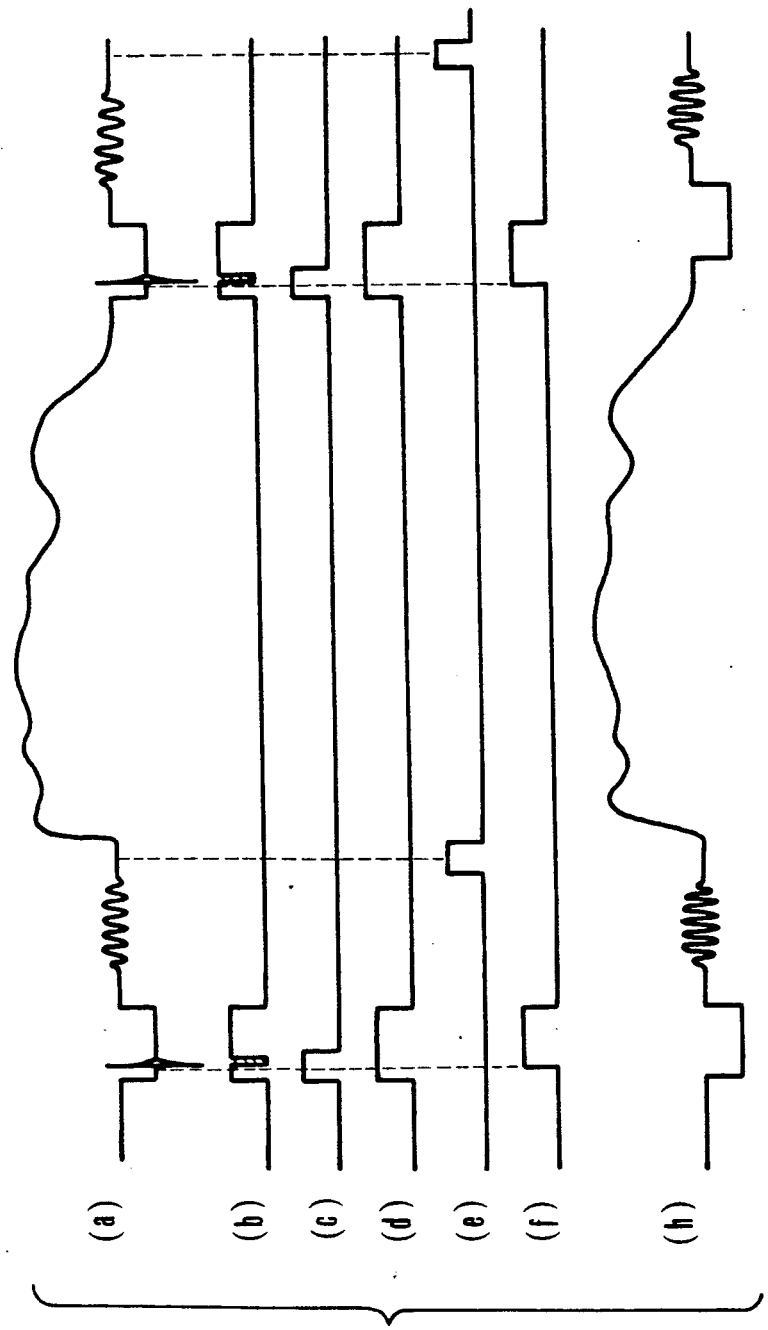
FIG. 27 shows signal wave forms obtained at the various parts of the circuit arrangement shown in FIG. 26.

A reproduced FM (frequency-modulated) video signal which comes via an input terminal (G) is first demodulated at the frequency demodulator 106. The wave form of the demodulated signal "a" thus obtained is as shown at a part (a) in FIG. 27. A blackened part in the wave form (a) represents the above stated wave form disturbance occurred at the sync tip part. The horizontal sync signal separation circuit 122 separates a horizontal sync signal "b" from the frequency demodulated signal "a". The wave form of the horizontal sync signal "b" is as shown at a part (b) of FIG. 27. As shown, there arises a drop-out part in the horizontal sync signal. The first pulse generating circuit 646 is triggered by the rising edge of the horizontal sync signal coming thereto. This causes the circuit 646 to generate a pulse of a given width as shown in FIG. 27. The triggering action on the first pulse generating circuit 646 is arranged to be not performed again after commencement of the generation of the pulse until the end thereof. The wave form of the pulse output "c" of the first pulse generating circuit 646 is as shown at a part (c) in FIG. 27.

To the OR gate 645 is supplied the above stated horizontal sync signal "b." The OR gate 645 produces an output pules "d", the wave form of which is as shown at a part (d) in FIG. 27. As shown, the signal drop-out which occurred in the horizontal sync signal "b" is corrected in the pulse "d", which has the same width as the horizontal sync signal "b". The output pulse "d" of the OR gate 645 is supplied to the clamp pulse generating circuit 648 to cause the latter to supply to the clamp circuit 649 a signal "e" which is of a wave form as shown at a part (e) of FIG. 27 and is supplied as a clamp pulse signal. In response to this, the clamp circuit 649 clamps the output signal "a" of the frequency demodulator 106 to fix a pedestal part immediately after the color burst part thereof to the reference voltage Vo.

The second pulse generating circuit 647 receives the pulse "d" and forms a signal therefrom a signal "f" of a wave form as shown at a part (f) of FIG. 27. The signal "f" is supplied to the S/H circuit 650 as a sample-and-hold pulse signal. The S/H circuit 650 samples and holds the reproduced video signal "g" coming from the clamp circuit 649 only at a part thereof at which the signal "f" is at a high level. As a result, the output signal "h" of the S/H circuit 650 becomes a video signal which has no wave form disturbance at the sync tip part thereof as shown at a part (h) in FIG. 27.

Figure 28:
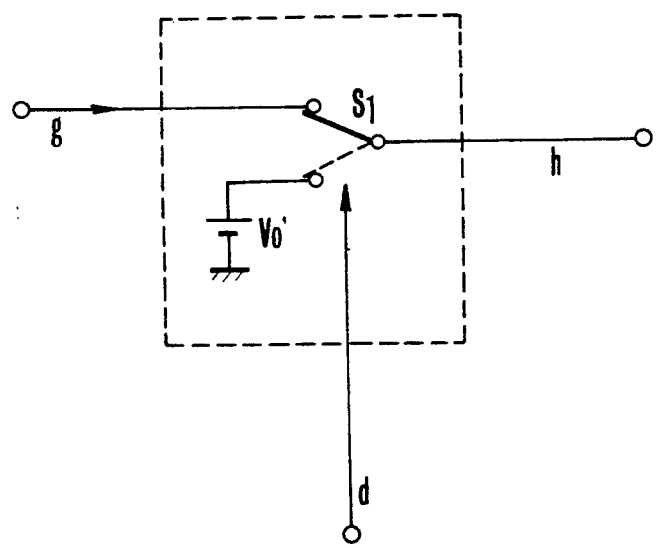
FIG. 28 shows the details of a sample-and-hold circuit, etc., included in the circuit arrangement of FIG. 26.

In the case of FIG. 26, the sample-and-hold (S/H) circuit 650 is disposed in a position after the clamp circuit 649. However, this arrangement may be changed to place the S/H circuit 650 before the clamp circuit 649. Further, the arrangement of the S/H circuit 650 of FIG. 26 may be changed as shown in FIG. 28. In the case of FIG. 28, the S/H circuit 650 comprises a switch S1 and a reference voltage Vo'. Assuming that the voltage level of the reference voltage Vo of FIG. 26 is arranged to be the pedestal level of the video signal, the reference voltage Vo' of FIG. 28 is equal to the voltage level of the sync tip part. Therefore, in the case of FIG. 28, the signal "d" causes every sync tip part of the input signal "g" to be replaced with the reference voltage Vo' before the signal "g" is produced as the signal "h."

In the embodiment described above, the sync tip part is used as the sync signal part. However, the usable sync signal part is not limited to the sync tip part but may be the front edge or rear edge of each sync signal part.

In recording, the embodiment is arranged to prevent the wave form disturbance of the frequency modulated video signal by replacing sync tip part thereof with a reference signal when the video signal is frequency modulated. At the time of reproduction, the embodiment is not only capable of reliably correcting time base variations of the reproduced video signal but also capable of removing voltage level variations of the sync tip part of the video signal after the correction of time base variations.

Figure 29:
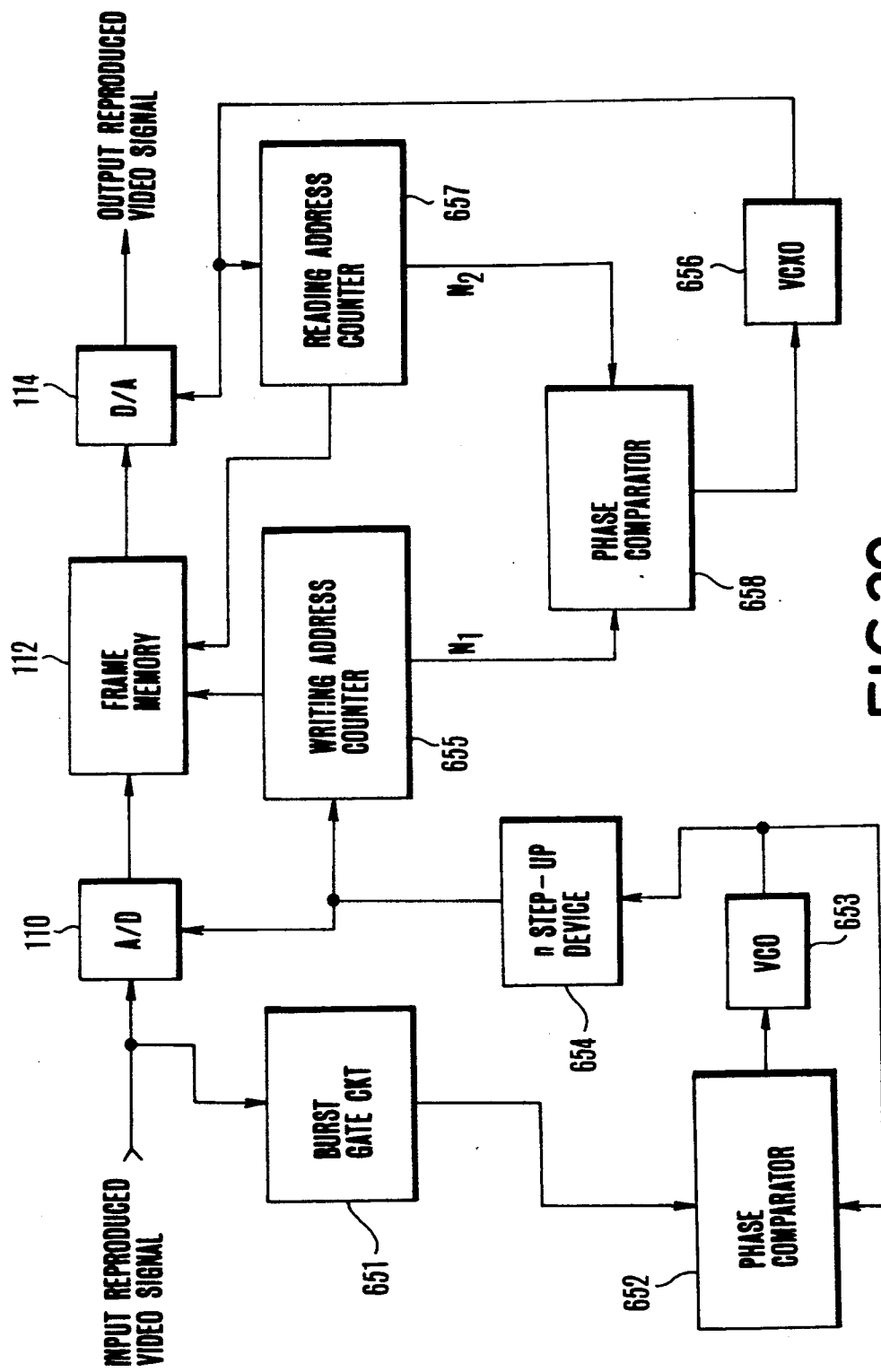
FIG. 29 is a block diagram showing by way of example a modification of the embodiment shown in FIG. 4.

In the case of the embodiment shown in FIG. 4, the clock signals for writing and reading into and from the memory are compared with each other to prevent the writing and reading addresses of the memory from overlapping each other. The arrangement of FIG. 4, however, may be changed as shown in FIG. 29. In the case of FIG. 29, the embodiment is arranged to compare the counted values of address counters which are arranged to designate the writing and reading addresses of the memory respectively. In FIG. 29, the same components and parts as those of FIG. 1 are indicated with the same reference numerals and the details of them are omitted from the following description:

Referring to FIG. 29, a reproduced video signal which has time base variations is supplied to an A/D (analog-to-digital) converter 110. The converter 110 then converts the input into digital video data consisting of, for example, eight bits. The data thus obtained is written into a frame memory 112. Meanwhile, a burst gate 651 extracts from the reproduced video signal only the burst signal thereof and supplies it to a phase comparator 652. At the phase comparator 652, the phase of the extracted burst signal is compared with that of a VCO (voltage controlled oscillator) 653 which is arranged to oscillate at a color subcarrier frequency fsc. As a result of the comparison, the phase comparator 652 produces an error signal. The oscillation frequency of the VCO 653 is then controlled according to the error signal. This causes the VCO 653 to oscillate following the burst signal which has time base variations and to produce a clock signal in synchronism with the time base variations.

The above stated clock signal from the VCO 653 is stepped up and increased by "n" times (n: a positive integer) by a step-up device 654. The stepped-up clock signal is supplied to an A/D converter 110 and a writing address counter 655 which is provided for a frame memory 112. The digital video data is thus written into the frame memory 112 at writing addresses one after another as designated by the writing address counter 655 according to the clock signal which follows the time base variations. The counted value of the writing address counter 655 is arranged to come back to the initial address value after it reaches a value corresponding to the upper limit address of the frame memory 112.

Meanwhile, a quartz oscillator (VCXO) 656 is arranged to produce another clock signal which is for reading out from the frame memory 112. The VCXO 656 oscillates at a frequency "m" fsc (m: a positive integer not equal to "n") which differs from the clock signal produced from the "n" step-up device 654 and is under the control of a phase comparator 658 as will be described later. The clock signal from the VCXO 656 is supplied to a reading address counter 657 and to a digital-to-analog (D/A) converter 114. The video data stored or written in the frame memory 112 is read out according to the reading clock signal and is supplied to the D/A converter 114. The D/A converter 114 then produces the video signal from its output terminal, with the time base variations of the video signal having been corrected.

The oscillation frequency of the above stated VCXO 656 of the embodiment is controlled as follows:

A counted value N1 which is produced from the writing address counter 655 and another counted value N2 which is produced from the reading address counter 658 are both supplied to a phase comparator 658. Both the counted values N1 and N2 are positive integer data indicative of the addresses of the frame memory 112.

The phase comparator 658 compares these inputs and produces a signal indicative of an address error. The address error signal is supplied to the reading clock signal generating VCXO 656. This causes the VCXO 656 to produce its oscillation frequency signal under the control of the error signal. In order to stabilize the the oscillation output of the VCXO 656 as mentioned in the foregoing, a variable frequency oscillator having a quartz oscillator is employed as the VCXO 656.

Further, the reading clock signal which is produced from the VCXO 656 does not have to be always in a given phasic relation to the writing clock signal. The control over the reading clock signal is required just for simply preventing the reading address from overlapping the writing address. With the VCXO 656 controlled in this manner to keep the counted values N1 and N2 of the writing and reading address counters 655 and 657 different from each other, the time base variations of the reproduced video signal can be adequately corrected by stabilizing the writing and reading actions on the frame memory.

What is claimed is:

1. An image signal recording apparatus for recording an image signal on a recording medium, comprising:
   a) modulating means arranged to receive an image signal, to angle-modulate the image signal and to output an angle-modulated image signal;
   d) reference signal generating means for generating a reference signal;
   c) phase comparison means for effecting phase-comparison of a phase of the angle-modulated image signal output from said modulating means and a phase of said reference signal and to output a phase error signal representing a result of said phase-comparison;
   d) synchronizing signal separating means arranged to receive said image signal and to separate a synchronizing signal contained in the received image signal;
   e) phase error signal supply means for supplying according to the synchronizing signal separated by said synchronizing signal separating means, the phase error signal output by said phase comparison means to said modulating means during a period of time when the synchronizing signal of said image signal is supplied to said modulating means; and
   f) recording means for recording on the recording medium an angle-modulated image signal which has been corrected and output by said modulating means according to the phase error signal supplied by said phase error signal supply means.

2. An apparatus according to claim 1, wherein said modulation means is arranged to angle-modulate said received image signal in accordance with the phase error signal received from said phase error signal supply means, such that the phase of the synchronizing signal part of the angle-modulated image signal is locked to the phase of the reference signal generated by said reference signal generating means.

3. An apparatus according to claim 1 wherein said reference signal generated by said reference signal generating means includes a signal of a frequency which is an integer times as high as the frequency of a horizontal synchronizing signal of said image signal.

4. An apparatus according to claim 1, wherein said reference signal generated by said reference signal generating means includes a signal of a frequency which is an integer times as high as a color subcarrier frequency of said image signal.

5. An image signal recording apparatus for recording an image signal on a recording medium, comprising:
   a) modulating means arranged to receive an image signal, to angle-modulate the received image signal and to output an angle-modulated image signal;
   b) synchronizing signal separating means arranged to receive said image signal, for separating a synchronizing signal from said image signal;
   c) reference signal generating means for generating a reference signal;
   d) reference signal phase control means arranged to effect phase comparison of a phase of the synchronizing signal separated by said synchronizing signal separating means with a phase of the reference signal generated by said reference signal generating means and to control the phase of the reference signal generated by said reference signal generating means according to a result of said phase comparison;
   e) phase comparison means for effecting phase-comparison of a phase of the angle-modulated image signal output from said modulating means and a phase of the reference signal output from said reference signal generating means to output a phase error signal representing a result of such phase-comparison;
   f) phase error signal supply means for supplying, according to the synchronizing signal separated by said synchronizing signal separating means, the phase error signal output from said phase comparison means to said modulating means during a period of time when the synchronizing signal of said image signal is supplied to said modulating means and for causing the angle-modulated image signal to be corrected by said modulating means; and
   g) recording means for recording on the recording medium an angle-modulated image signal which has been corrected and output by said modulating means according to the phase error signal supplied by said phase error signal supply means.

6. An image signal recording apparatus for recording an image signal on a recording medium, comprising:
   a) modulating means arranged to receive an image signal, to angle-modulate the received image signal and to output an angle-modulated image signal;
   b) synchronizing signal separating means arranged to receive the image signal and to separate a synchronizing signal from the received image signal;
   c) reference signal generating means for generating a reference signal;

d) burst signal separating means for separating a burst signal contained in the received image signal, according to the synchronizing signal separated by said synchronizing signal separating means;

e) reference signal phase control means arranged to effect phase-comparison of a phase of the burst signal separated by said burst signal separating means and a phase of the reference signal generated by said reference signal generating means and to control the phase of the reference signal generated from said reference signal generating means according to a result of said phase comparison;

f) phase comparison means for effecting phase-comparison of a phase of the angle-modulated image signal output from said modulating means and a phase of the reference signal output from said reference signal generating means to output a phase error signal representing a result of such phase-comparison;

g) phase error signal supply means for supplying, according to the synchronizing signal separated by said synchronizing signal separating means, the phase error signal output from said phase comparison means to said modulating means during a period of time when the synchronizing signal of said image signal is supplied to said modulating means and for causing the angle-modulated image signal to be corrected by said modulating means; and h) recording means for recording on the recording medium the angle-modulated image signal which has been corrected and output by said modulating means according to the phase error signal supplied by said phase error signal supply means.

7. An image signal recording apparatus for recording an image signal on a recording medium, comprising:

a) modulating means arranged to receive an image signal, to angle-modulate the received image signal and to output an angle-modulated image signal;

b) synchronizing signal separating means arranged to receive the image signal and to separate synchronizing signal from the received image signal;

c) reference signal generating means for generating a reference signal;

d) burst signal separating means for separating a burst signal contained in the received image signal according to the synchronizing signal separated by said synchronizing signal separating means;

e) first phase comparison means for effecting phase-comparison of a phase of the burst signal separated by said burst signal separating means and a phase of the reference signal generated by said reference signal separating means to output a first phase error signal;

f) second phase comparison means for effecting phase-comparison of a phase of the synchronizing signal separated by said synchronizing signal separating means and a phase of the reference signal generated by said reference signal generating means to output a second phase error signal;

g) reference signal phase control means for controlling the phase of the reference signal generated by said reference signal generating means, by using the first phase error signal output from said first phase comparison means and the second phase error signal output from said second phase comparison means;

h) phase comparison means for effecting phase-comparison of a phase of the angle-modulated image signal output from said modulating means and a phase of the reference signal output from said reference signal generating means to output a phase error signal representing a result of such phase-comparison;

i) phase error signal supply means for supplying, according to the synchronizing signal separated by said synchronizing signal separating means, the phase error signal output from said phase comparison means to said modulating means during a period of time when the synchronizing signal of said image signal is supplied to said modulating means and for causing the angle-modulated image signal to be corrected by said modulating means; and j) recording means for recording on the recording medium the angle-modulated image signal which has been corrected and output by said modulating means according to the phase error signal supplied by said phase error signal supply means.

* * * * *